(12) United States Patent
Kim et al.

(10) Patent No.: US 10,811,147 B2
(45) Date of Patent: Oct. 20, 2020

(54) PASSIVE RESIDUAL HEAT REMOVAL SYSTEM AND ATOMIC POWER PLANT COMPRISING SAME

(71) Applicant: KOREA ATOMIC ENERGY RESEARCH INSTITUTE, Daejeon (KR)

(72) Inventors: Young In Kim, Daejeon (KR); Keung Koo Kim, Daejeon (KR); Jae Joo Ha, Daejeon (KR); Ju Hyeon Yoon, Daejeon (KR); Young Min Bae, Daejeon (KR); Soo Jai Shin, Daejeon (KR); Hun Sik Han, Daejeon (KR); Kyung Jun Kang, Jeollabuk-do (KR); Tae Wan Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 581 days.

(21) Appl. No.: 15/108,767

(22) PCT Filed: Dec. 29, 2014

(86) PCT No.: PCT/KR2014/012995
§ 371 (c)(1),
(2) Date: Jun. 28, 2016

(87) PCT Pub. No.: WO2015/102348
PCT Pub. Date: Jul. 9, 2015

(65) Prior Publication Data
US 2016/0322121 A1    Nov. 3, 2016

(30) Foreign Application Priority Data
Jan. 6, 2014   (KR) .................. 10-2014-0001461

(51) Int. Cl.
*G21C 15/18*   (2006.01)
*G21C 1/32*   (2006.01)
(Continued)

(52) U.S. Cl.
CPC .............. *G21C 15/18* (2013.01); *F22B 1/023* (2013.01); *G21C 1/322* (2013.01); *G21C 9/012* (2013.01);
(Continued)

(58) Field of Classification Search
CPC ........ G21C 15/18; G21C 1/322; G21C 15/08; G21C 15/243; G21C 15/26; G21C 9/012; F22B 1/023; G21D 1/006
See application file for complete search history.

(56) References Cited

U.S. PATENT DOCUMENTS 4,249,595 A * 2/1981 Butt .................. F25J 5/002
                                                   165/110
5,224,358 A * 7/1993 Yamanaka ............. F25B 39/04
                                                   62/509
(Continued)

FOREIGN PATENT DOCUMENTS

KR   2002-0037105    5/2002
KR   10-2006-0020756   3/2006
(Continued)

OTHER PUBLICATIONS

International Search Report for PCT/KR2014/012995, dated Apr. 15, 2015, 2 pages.

*Primary Examiner* — Lily C Garner
(74) *Attorney, Agent, or Firm* — Scully Scott Murphy and Presser

(57) ABSTRACT

The present invention provides a passive residual heat removal system and an atomic power plant comprising the same, the passive heat removal system comprising: a plate-
(Continued)

type heat exchanger for causing heat exchange between a primary system fluid or a secondary system fluid which, in order to remove sensible heat from an atomic reactor cooling material system and residual heat from a reactor core, has received the sensible heat and the residual heat, and a cooling fluid which has been introduced from outside of a containment unit; and circulation piping for connecting the atomic reactor cooling material system to the plate-type heat exchanger, thereby forming a circulation channel of the primary system fluid, or connecting a steam generator, which is arranged at the boundary between the primary and secondary systems, to the plate-type heat exchanger, thereby forming a circulation channel of the secondary system fluid.

12 Claims, 17 Drawing Sheets

(51) Int. Cl.
| | | |
|---|---|---|
| *G21C 9/012* | (2006.01) | |
| *G21C 15/243* | (2006.01) | |
| *G21D 1/00* | (2006.01) | |
| *F22B 1/02* | (2006.01) | |
| *G21C 15/26* | (2006.01) | |
| *G21C 15/08* | (2006.01) | |

(52) U.S. Cl.
CPC .......... *G21C 15/08* (2013.01); *G21C 15/243* (2013.01); *G21C 15/26* (2013.01); *G21D 1/006* (2013.01); *Y02E 30/40* (2013.01); *Y02P 80/154* (2015.11)

(56) References Cited

U.S. PATENT DOCUMENTS

| | | | | |
|---|---|---|---|---|
| 5,612,982 | A | * 3/1997 | Woodcock | ............. G21C 15/18 |
| | | | | 376/298 |
| 2010/0051246 | A1 | * 3/2010 | Kim | ........................... C01B 3/06 |
| | | | | 165/134.1 |
| 2012/0118526 | A1 | * 5/2012 | Sudau | ................... B22D 11/00 |
| | | | | 165/7 |

FOREIGN PATENT DOCUMENTS

| | | |
|---|---|---|
| KR | 10-1242743 | 3/2013 |
| KR | 101242743 B1 * | 3/2013 |
| KR | 10-1255588 | 4/2013 |
| KR | 101255588 B1 * | 4/2013 |
| WO | WO-2012/176336 | 2/2015 |

* cited by examiner

US 10,811,147 B2

PASSIVE RESIDUAL HEAT REMOVAL SYSTEM AND ATOMIC POWER PLANT COMPRISING SAME

CROSS-REFERENCE TO RELATED APPLICATIONS

This application is the national phase of PCT application PCT/KR2014/012995 having an international filing date of 29 Dec. 2014, which claims the benefit of earlier filing date and right of priority to Korean Application No. 10-2014-0001461, filed on 6 Jan. 2014, the contents of which are incorporated by reference herein in their entirety.

BACKGROUND OF THE INVENTION

1. Field of the Invention

The present disclosure relates to a passive residual heat removal system to which a plate type heat exchanger is applied and a nuclear power plant including the same.

2. Description of the Related Art

Reactors are divided into active reactors using active power such as a pump, and passive reactors using passive power such as a gravity force, a gas pressure or the like according to the configuration method of a safety system. Furthermore, reactors are divided into loop type reactors (for example, Korean pressurized water reactor) in which main components (a steam generator, a pressurizer, a pump impeller, etc.) are installed at an outside of the reactor vessel, and integrated type reactors (for example, SMART reactor) in which the main components are installed at an inside of the reactor vessel according to the installation location of the main component.

A passive residual heat removal system has been employed as a system for removing heat in a reactor coolant system (sensible heat in the reactor coolant system and residual heat in the core) when an accident occurs in various nuclear power plants including an integral reactor. For a coolant circulation method of the passive residual heat removal system, two methods such as a method of directly circulating reactor primary coolant to cool a reactor (AP1000: U.S. Westinghouse) and a method of circulating secondary coolant using a steam generator to cool a reactor (SMART reactor: Korea) are mostly used, and a method of injecting primary coolant to a tank to directly condense it (CAREM: Argentina) is partially used.

Furthermore, for a method of cooling an outside of a heat exchanger (condensation heat exchanger), a water-cooled method (AP1000), a partially air-cooled method (WWER 1000: Russia), and a water-air hybrid cooled method (IMR: Japan) have been used. A heat exchanger of the passive residual heat removal system performs a function of transferring heat received from a reactor to an outside (ultimate heat sink) through an emergency cooling tank or the like, and condensation heat exchangers using a steam condensation phenomenon with an excellent heat transfer efficiency have been mostly employed for a heat exchanger method.

However, in general, a passive residual heat removal system may use primary coolant (reactor coolant system) or secondary coolant (steam generator) to perform the role of a pressure boundary to a primary system or secondary system, and a heat exchanger of the passive residual heat removal system may typically form a boundary to atmospheric environment outside the containment building, and when a pressure boundary is damaged, primary coolant or secondary coolant may be discharged to atmospheric environment, and therefore, maintaining a pressure boundary during an accident is a very important role.

Accordingly, a method of enhancing the performance of a passive residual heat removal system may be taken into consideration to enhance the performance of a reactor.

SUMMARY OF THE INVENTION

An object of the present disclosure is to provide a passive residual heat removal system for overcoming the coverage limit of a plate type heat exchanger and solving a problem such as flow instability or the like occurring in applying the plate type heat exchanger, and a nuclear power plant including the same.

Another object of the present disclosure is to propose a passive residual heat removal system for effectively removing sensible heat in a reactor coolant system and residual heat in a core through a high heat exchange efficiency while maintaining a pressure boundary between heat exchange fluids in a passive manner, and a nuclear power plant including the same.

In order to accomplish the foregoing object of the present disclosure, a passive residual heat removal system according to an embodiment of the present disclosure may include a plate type heat exchanger configured to exchange heat between primary system fluid or secondary system fluid that has received sensible heat in a reactor coolant system and residual heat in a core and cooling fluid introduced from an inside or outside of a containment to remove the sensible heat and residual heat, and a circulation line configured to connect the reactor coolant system to the plate type heat exchanger to form a circulation flow path of the primary system fluid or connect a steam generator disposed at a boundary between a primary system and a secondary system to the plate type heat exchanger to form a circulation flow path of the secondary system fluid.

According to the present disclosure having the foregoing configuration, a plate type heat exchanger having high-density heat transfer performance and durability to high temperature and high pressure may be applicable to a passive residual heat removal system. According to the present disclosure, a closed flow path and an open flow path or partially open flow path may be selectively introduced to a plate type heat exchanger of a passive residual heat removal system to efficiently circulate and discharge cooling fluid or atmosphere, and a water cooling, air cooling or hybrid cooling method may be all applicable thereto.

Furthermore, according to the present disclosure, a passive residual heat removal system having a collection of heat exchangers configured with a plurality of plate type heat exchangers may be provided by freely choosing a width and a height of the plate and freely selecting a number of plates. Accordingly, it may be possible to provide a passive residual heat removal system for mitigating a bottleneck phenomenon at an inlet of the plate type heat exchanger.

In addition, the present disclosure may maintain a safety function of a passive residual heat removal system for a long period of time (in a semi-permanent manner) through the employment of an air cooling or hybrid cooling method.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
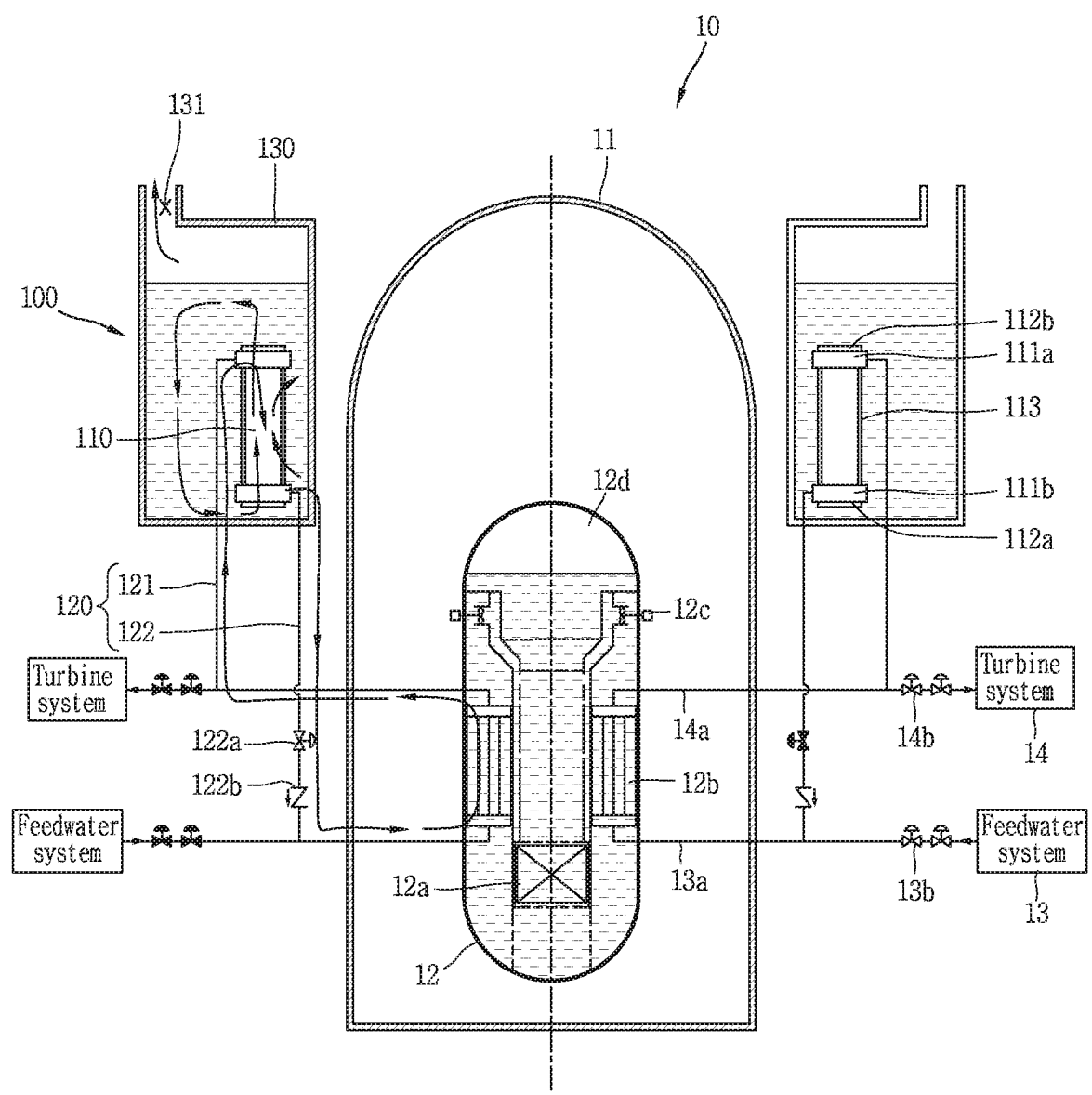
FIG. 1 is a conceptual view illustrating a passive residual heat removal system and a nuclear power plant including the same associated with an embodiment of the present disclosure.

Hereinafter, a passive residual heat removal system associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

A plate type heat exchanger in the present disclosure may refer to all plate type heat exchangers as far as there is any difference in the processing method or bonding method of a plate thereof as well as a typical plate type heat exchanger and a printed circuit type heat exchanger, unless otherwise specified in particular.

FIG. 1 is a conceptual view illustrating a passive residual heat removal system 100 and a nuclear power plant 10 including the same associated with an embodiment of the present disclosure.

The nuclear power plant 10 illustrated in FIG. 1 is illustrated as an integral reactor, but the present disclosure may not only be applicable to an integral reactor, but also be applicable to a loop type reactor.

Referring to FIG. 1, for the sake of convenience of explanation, the passive residual heat removal system 100 and the nuclear power plant 10 including the same disclosed in the present disclosure are symmetrically illustrated around a reactor coolant system 12.

Furthermore, a normal operation of the nuclear power plant 10 is illustrated on the right of FIG. 1, and the occurrence of an accident at the nuclear power plant 10 is illustrated on the left. It is likewise in the other drawings illustrated below to be symmetrical to each other.

The nuclear power plant 10 may include various systems maintaining the integrity of the nuclear power plant 10 in preparation for a normal operation and the occurrence of an accident, and further include structures such as the containment 11, and the like.

The containment 11 is formed to surround the reactor coolant system 12 at an outside of the reactor coolant system 12 to prevent the leakage of radioactive materials. The containment 11 performs the role of a final barrier for preventing the leakage of radioactive materials from the reactor coolant system 12 to external environment.

The containment 11 is divided into a containment building (or referred to as a reactor building) configured with reinforced concrete, and a containment vessel and a safeguard vessel configured with steel containment. The containment vessel is a large sized vessel designed at a low pressure such as a containment building, and the safeguard vessel is a small-sized vessel designed with a small size by increasing a design pressure. According to the present disclosure, the containment 11 may collectively refer to a containment building, a reactor building, a containment vessel, a safeguard vessel, and the like, unless otherwise specified in particular.

During a normal operation of the nuclear power plant 10, when feedwater is supplied from a feedwater system 13 to a steam generator 12b through a main feedwater line 13a, steam is generated by the steam generator 12b using heat transferred from a reactor core 12a. The steam is supplied to a turbine system 14 through a main steam line 14a, and the turbine system 14 produces electricity using the supplied steam.

Isolation valves 13b, 14b installed at the main feedwater line 13a and main steam line 14a are open during a normal operation of the nuclear power plant 10, but closed by an actuation signal during the occurrence of an accident.

Primary system fluid is filled into the reactor coolant system 12, and heat transferred from the reactor core 12a to the primary system fluid is transferred to secondary system fluid in the steam generator 12b. A primary system of the nuclear power plant 10 is a system for directly receiving heat from the reactor core 12a to cool the reactor core 12a, and a secondary system is a system for receiving heat from the primary system while maintaining a pressure boundary to the primary system to produce electricity using the received heat. In particular, a pressure boundary should be necessarily maintained between the primary system and the secondary system to ensure the integrity of a pressurized water nuclear power plant.

A reactor coolant pump 12c for circulating primary system fluid, and a pressurizer 12d for suppressing the boiling of coolant and controlling an operating pressure are installed at the reactor coolant system 12. The steam generator 12b is disposed at a boundary between the primary system and the secondary system to transfer heat between the primary system fluid and the secondary system fluid.

The passive residual heat removal system 100, as one of major systems for securing the safety of the nuclear power plant 10 when an accident occurs, is a system for removing sensible heat in the reactor coolant system 12 and residual heat in the reactor core 12a to discharge them to an outside.

Hereinafter, first, the composition of the passive residual heat removal system 100 will be described, and then the operation of the passive residual heat removal system 100 when an accident occurs at the nuclear power plant 10 will be described.

The passive residual heat removal system 100 may include a plate type heat exchanger 110, and a circulation line 120, and further include an emergency cooling water storage section 130. The plate type heat exchanger 110 is surrounded by a casing 113.

The plate type heat exchanger 110 may be installed at least one place of an inside and an outside of the containment 11. The plate type heat exchanger 110 exchanges heat between primary system fluid or secondary system fluid that have received the sensible heat and residual heat and cooling fluid introduced from an outside of the containment 11 to remove sensible heat in the reactor coolant system 12 and residual heat in the reactor core 12 a.

The plate type heat exchanger 110 illustrated in FIG. 1 is installed at an outside of the containment 11, and configured to exchange heat between secondary system fluid and cooling fluid outside the containment 11.

The circulation line 120 connects the reactor coolant system 12 to the plate type heat exchanger 110 or connects the steam generator 12 b between the primary system and the secondary system to the plate type heat exchanger 110 to form a circulation flow path of the primary system fluid or secondary system fluid. The circulation line 120 connected between the steam generator 12 b and the plate type heat exchanger 110 to form a circulation flow path of the secondary system fluid is illustrated in FIG. 1.

The plate type heat exchanger 110 is arranged on a plate to be distinguished from each other to exchange heat between primary system fluid or secondary system fluid supplied through the circulation line 120 and cooling fluid while maintaining a pressure boundary, and may include a plurality of channels (not shown) for allowing the fluids to alternately pass therethrough.

The plate type heat exchanger 110 may include at least one of a printed circuit type heat exchanger and a plate type heat exchanger. The printed circuit type heat exchanger is provided with channels formed by diffusion bonding and densely formed by a photochemical etching technique. On the contrary, the plate type heat exchanger extrudes a plate to form channels, and is formed to couple (or join) the plates using at least one of a gasket, a welding, and a brazing welding methods.

The channels may include first flow paths (not shown) and second flow paths (not shown) for allowing different fluids to pass therethrough. The first flow paths are arranged to be separated from one another to allow cooling fluid for cooling primary system fluid or secondary system fluid to pass therethrough. A plurality of second flow paths are formed to allow the primary system fluid or the secondary system fluid to pass therethrough, and alternately arranged with the first flow paths to exchange heat while maintaining a pressure boundary to the cooling fluid.

The plate type heat exchanger 110 of FIG. 1 uses the circulation of secondary system fluid, and thus the secondary system fluid flows through the second flow path, and cooling fluid flowing through the first flow path cools the secondary system fluid.

An inlet header 111 a, 112a and an outlet header 111 b, 112 b are formed at each inlet and outlet of the plate type heat exchanger 110. The inlet header 111 a, 112a is formed at an inlet of the first flow path and the second flow path to distribute fluids supplied to the plate type heat exchanger to each channel. The outlet header 111b, 112b is formed at an outlet of the first flow path and the second flow path to collect the fluids that have passed the each channel. The fluids supplied to the plate type heat exchanger 110 may include cooling fluid passing through the first flow path, primary system fluid or secondary system fluid passing through the second flow path. In particular, in the passive residual heat removal system 100 illustrated in FIG. 1, the fluids supplied to the plate type heat exchanger 110 are cooling fluid and secondary system fluid.

In FIG. 1, the inlet header 111a and outlet header 111b of the second flow path are necessarily provided to maintain a pressure boundary. However, since the first flow path has a configuration in which the inlet and outlet thereof are open to the fluid of the emergency cooling water storage section, it is a configuration in which the inlet header 112 a and outlet header 112 b are selectively provided to efficiently perform inlet and outlet flow. Accordingly, the inlet header 112 a and outlet header 112 b may not be provided at the first flow path, and replaced by an inlet guide structure, an outlet guide structure, and the like in the form of being extended from the first flow path to an outside.

The cooling fluid and secondary system fluid exchange heat while flowing in different directions, and thus the inlet of the first flow path is disposed adjacent to the outlet of the second flow path, and the outlet of the first flow path is disposed adjacent to the inlet of the second flow path. Furthermore, the inlet header 112 a of the first flow path is disposed adjacent to the outlet header 111 b of the second flow path, and the outlet header 112 b of the first flow path is disposed adjacent to the inlet header 111 a of the second flow path.

The circulation line 120 may include a steam line 121 for supplying secondary system fluid to the plate type heat exchanger 110 and a feedwater line 122 for receiving secondary system fluid from the plate type heat exchanger 110.

The steam line 121 is branched from a main steam line 14 a and connected to the inlet of the second flow path to receive the secondary system fluid from the main steam line 14 a extended from an outlet of the steam generator 12 b. The feedwater line 122 is branched from a main feedwater line 13 a extended to the inlet of the steam generator 12 b and connected to the outlet of the second flow path to transfer heat to the cooling fluid and recirculate the cooled secondary system fluid into the steam generator 12 b.

The passive residual heat removal system 100 may include the emergency cooling water storage section 130.

The emergency cooling water storage section 130 is formed to store cooling fluid therewithin and installed at an outside of the containment 11. The emergency cooling water storage section 130 is provided with an opening portion 131 at an upper portion thereof to dissipate heat transferred by evaporating the cooling fluid stored therewithin during a temperature increase due to heat transferred from the primary system fluid or the secondary system fluid to cooling fluid.

At least part of the plate type heat exchanger 110 may be installed within the emergency cooling water storage section 130 to allow at least part thereof to be immersed into the cooling fluid. In this case, the steam line 121 and the feedwater line 122 may be connected to the main steam line 14a and the main feedwater line 13a, respectively, from an outside of the containment 11 through the emergency cooling water storage section 130.

As illustrated in FIG. 1, when the plate type heat exchanger 110 is completely immersed into the cooling fluid of the emergency cooling water storage section 130, the plate type heat exchanger 110 cools secondary system fluid using the cooling fluid (coolant) of the emergency cooling water storage section 130 with a water cooling method.

Next, the operation of the passive residual heat removal system 100 during the occurrence of an accident will be described. The left side of the drawing illustrated to be symmetric to each other in FIG. 1 illustrates a state of the passive residual heat removal system 100 during the occurrence of an accident.

When a loss of coolant accident or non-loss of coolant accident (steam line break or the like) occurs at the nuclear power plant 10, isolation valves 13 b, 14 b installed at the main feedwater line 13 a and the main steam line 14 a are closed by related signals. Furthermore, an isolation valve 122 a installed at the feedwater line 122 of the passive residual heat removal system 100 is open by related signals, and a check valve 122 b installed at the steam line 121 is open by the flow of the secondary system fluid formed by opening the isolation valve 122 a. Accordingly, the supply of feedwater from the feedwater system 13 to the steam generator 12 b is suspended, and secondary system fluid is circulated within the passive residual heat removal system 100.

The secondary system fluid sequentially passes through the feedwater line 122 and the main feedwater line 13 a to be introduced to an inlet of the steam generator 12 b. The secondary system fluid supplied to the steam generator 12 b receives sensible heat from primary system fluid within the reactor coolant system 12 and residual heat in the reactor core 12 a at the steam generator 12 b, and the temperature of the secondary system fluid increases to evaporate at least part thereof.

The secondary system fluid discharged through the outlet of the steam generator 12 b flows upward along the main steam line 14 a and the steam line 121 of the passive residual heat removal system 100 and is introduced to the second flow path of the plate type heat exchanger 110.

The cooling fluid within the emergency cooling water storage section 130 is introduced to the first flow path of the plate type heat exchanger 110, and heat is transferred from the secondary system fluid to the cooling fluid in the plate type heat exchanger 110.

The secondary system fluid that has transferred heat to the cooling fluid is cooled and condensed and flows downward, and moves again along the feedwater line 122 to circulate through the steam generator 12 b. The circulation of the secondary system fluid is generated by natural phenomenon due to a density difference, and thus the circulation of the secondary system fluid continues until sensible heat in the reactor coolant system 12 and residual heat in the reactor core 12 a are almost removed and a density difference required for the circulation of the secondary system fluid almost disappears.

When heat is transferred from the secondary system fluid to the cooling fluid, the temperature within the emergency cooling water storage section 130 gradually increases. At least part of the cooling fluid is evaporated and discharged to an outside through the opening portion 131, and heat transferred to the cooling fluid is also discharged to the outside.

In this manner, the passive residual heat removal system 100 may circulate secondary system fluid in a passive method due to a natural force to remove sensible heat in the reactor coolant system 12 and residual heat in the reactor core 12 a. Furthermore, the plate type heat exchanger 110 may be configured to allow the secondary system fluid and the cooling fluid to pass through different channels to exchange heat, thereby preventing damage at a pressure boundary and inducing sufficient heat exchange through small flow paths.

Hereinafter, another embodiment of the passive residual heat removal system will be described.

Figure 2:
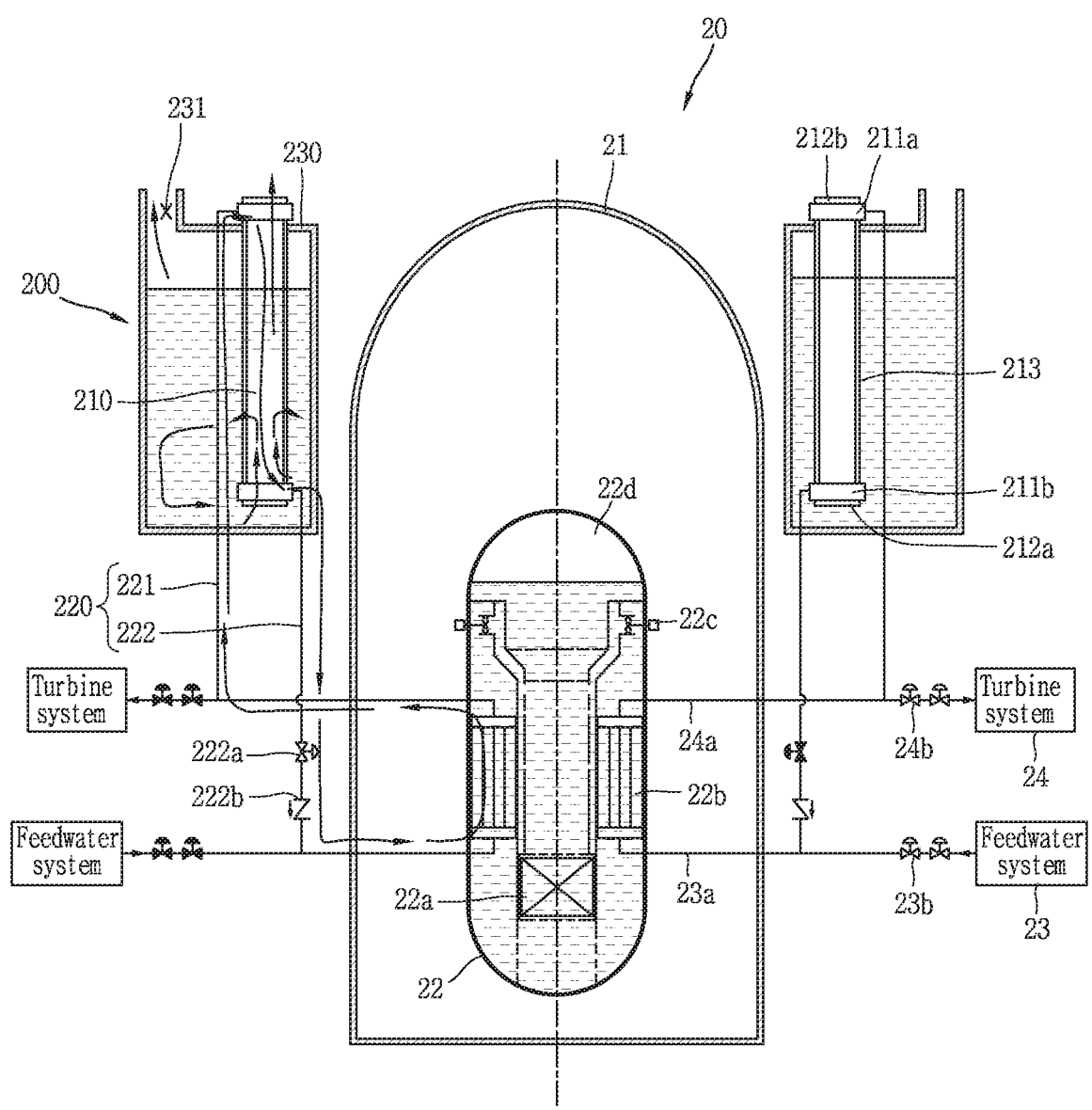
FIG. 2 is a conceptual view illustrating a passive residual heat removal system and a nuclear power plant including the same associated with another embodiment of the present disclosure.

FIG. 2 is a conceptual view illustrating a passive residual heat removal system 200 and a nuclear power plant 20 including the same associated with another embodiment of the present disclosure.

At least part of a plate type heat exchanger 210 is immersed into the cooling fluid of an emergency cooling water storage section 230 to allow cooling fluid within the emergency cooling water storage section 230 and atmosphere outside a containment 21 to pass therethrough to a first flow path. The emergency cooling water storage section 230 is provided with an opening portion 231 at an upper portion thereof. An upper end portion of the plate type heat exchanger 210 may be formed in a protruding manner to an upper side of the emergency cooling water storage section 230 through the emergency cooling water storage section 230 to discharge cooling fluid evaporated by heat transfer with secondary system fluid and/or atmosphere to the outside. The other configuration is similar to the description of FIG. 1.

The plate type heat exchanger 210 is formed in a relatively lengthy manner compared to the plate type heat exchanger 210 illustrated in FIG. 1 to provide two heat exchange conditions of water cooling and air cooling methods to fluids that exchange heat in the plate type heat exchanger 210.

The left and the right of nuclear power plant 20 of FIG. 2 are symmetrically illustrated, wherein the right side thereof illustrates a normal operation state, and the left side thereof illustrates an early stage of the occurrence of an accident.

When an accident occurs such as a loss of coolant accident or the like, secondary system fluid discharged from an outlet of the steam generator 22b is introduced into an inlet of the second flow path of the plate type heat exchanger 210 through a main steam line 24a and a steam pipe 221. During an early stage of the occurrence of an accident, cooling fluid is sufficiently stored within the emergency cooling water storage section 230, and at least part of the plate type heat exchanger 210 is immersed into the cooling fluid, and the heat exchange performance of a water cooling method is significantly higher than that of an air cooling method, and thus the secondary system fluid is cooled by the water cooling method.

The secondary system fluid cooled in the plate type heat exchanger 210 and discharged from an outlet of the second flow path is circulated again into the steam generator 22b through a feedwater pipe 222 and a main feedwater line 23a to remove sensible heat in the reactor coolant system 22 and residual heat in the reactor core 22a through a continuous circulation.

Figure 3:
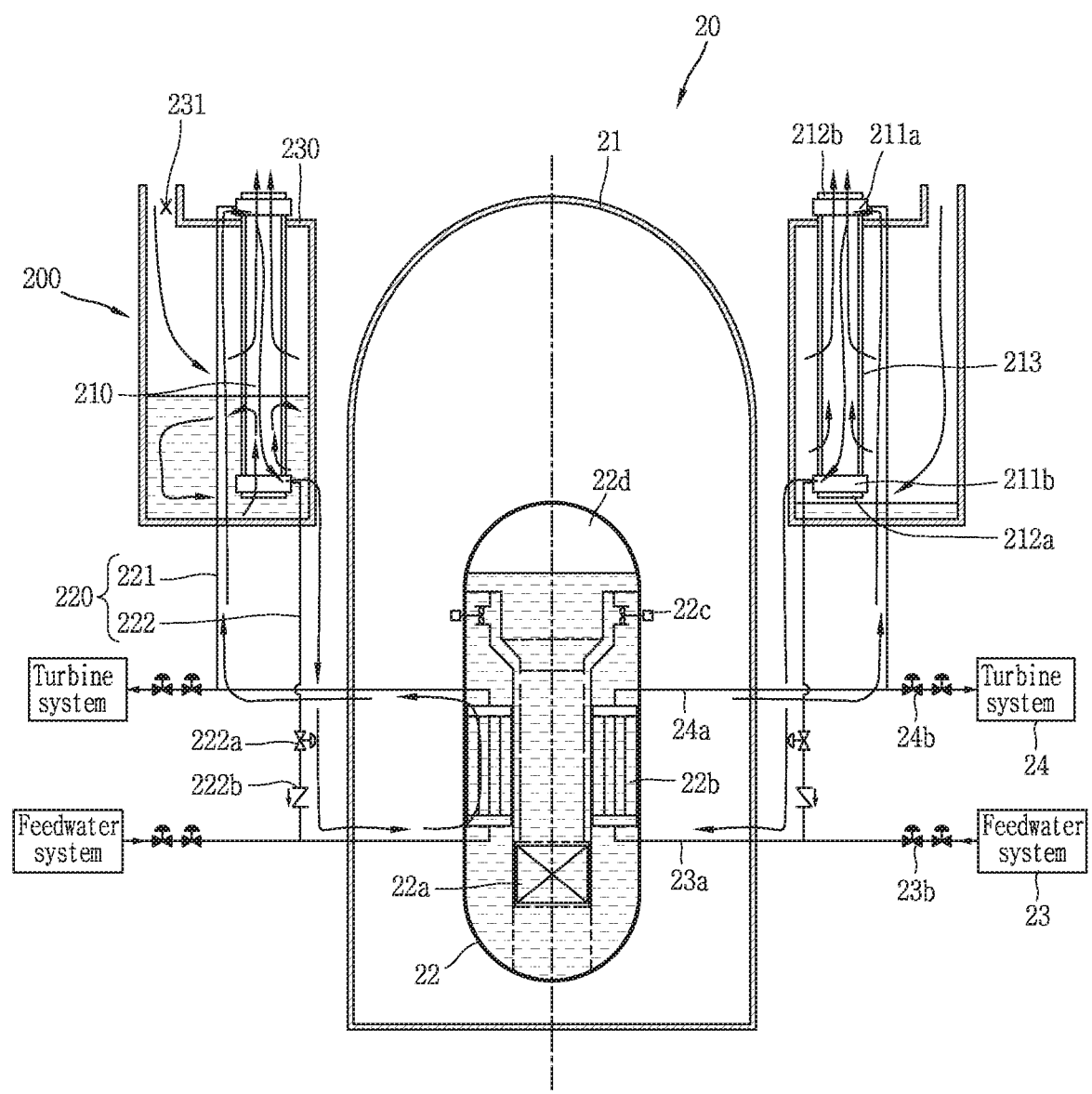
FIG. 3 is a conceptual view illustrating an intermediate stage and a late stage of the accident in which time has passed after the occurrence of the accident in a passive residual heat removal system and a nuclear power plant including the same illustrated in FIG. 2.

FIG. 3 is a conceptual view illustrating an intermediate stage and a late stage of the accident in which time has passed after the occurrence of the accident in a passive residual heat removal system 200 and a nuclear power plant 20 including the same illustrated in FIG. 2.

In FIG. 3, the left side thereof illustrates an intermediate stage of the accident and the right side thereof illustrates a late stage of the accident around a symmetric drawing.

First, referring to the drawing illustrating an intermediate stage of the accident, it is seen that a water level is decreased due to the evaporation of the cooling fluid of the emergency cooling water storage section 230 compared to an early stage of the accident. The emergency cooling water storage section 230 is provided with an opening portion 231 at an upper portion thereof. As a water level of the cooling fluid of the emergency cooling water storage section 230 is reduced, the cooling fluid of the emergency cooling water storage section 230 and atmosphere outside the containment 21 are introduced to the first flow path of the plate type heat exchanger 210 to cool the secondary system fluid with a water-air hybrid cooled method.

Next, referring to a drawing illustrating a late stage of the accident on the right, it is seen that the water level is further decreased due to the evaporation of most cooling fluid of the emergency cooling water storage section 230 compared to an intermediate stage of the accident. Accordingly, atmosphere outside of the containment 21 is introduced to the first flow path of the plate type heat exchanger 210 to cool the secondary system fluid with an air cooled method.

The cooling method of the plate type heat exchanger 210 formed as described above may vary according to the water level of the cooling fluid stored in the emergency cooling water storage section 230 and the passage of time subsequent to the occurrence of an accident. It uses a characteristic in which residual heat in the reactor core 22a is gradually reduced as time has passed subsequent to the occurrence of an accident. A water cooling method, a hybrid method mixed with a water cooling method and an air cooling method may be sequentially employed and configured to be switched to an appropriate cooling method according to residual heat reduction to enhance cooling efficiency and maintain cooling durability. Accordingly, the passive residual heat removal system 200 may continuously remove sensible heat in the reactor coolant system 22 and residual heat in the reactor core 22a.

FIGS. 2 and 3 also illustrate a circulation line 220, an isolation valve 222a, a check valve 222b, a reactor coolant pump 22c, a pressurizer 22d, isolation valves 23b, isolation valves 24b, an outlet header 212b, an inlet header 211a, a casing 213, an outlet header 211b, an inlet header 212a.

Figure 4:
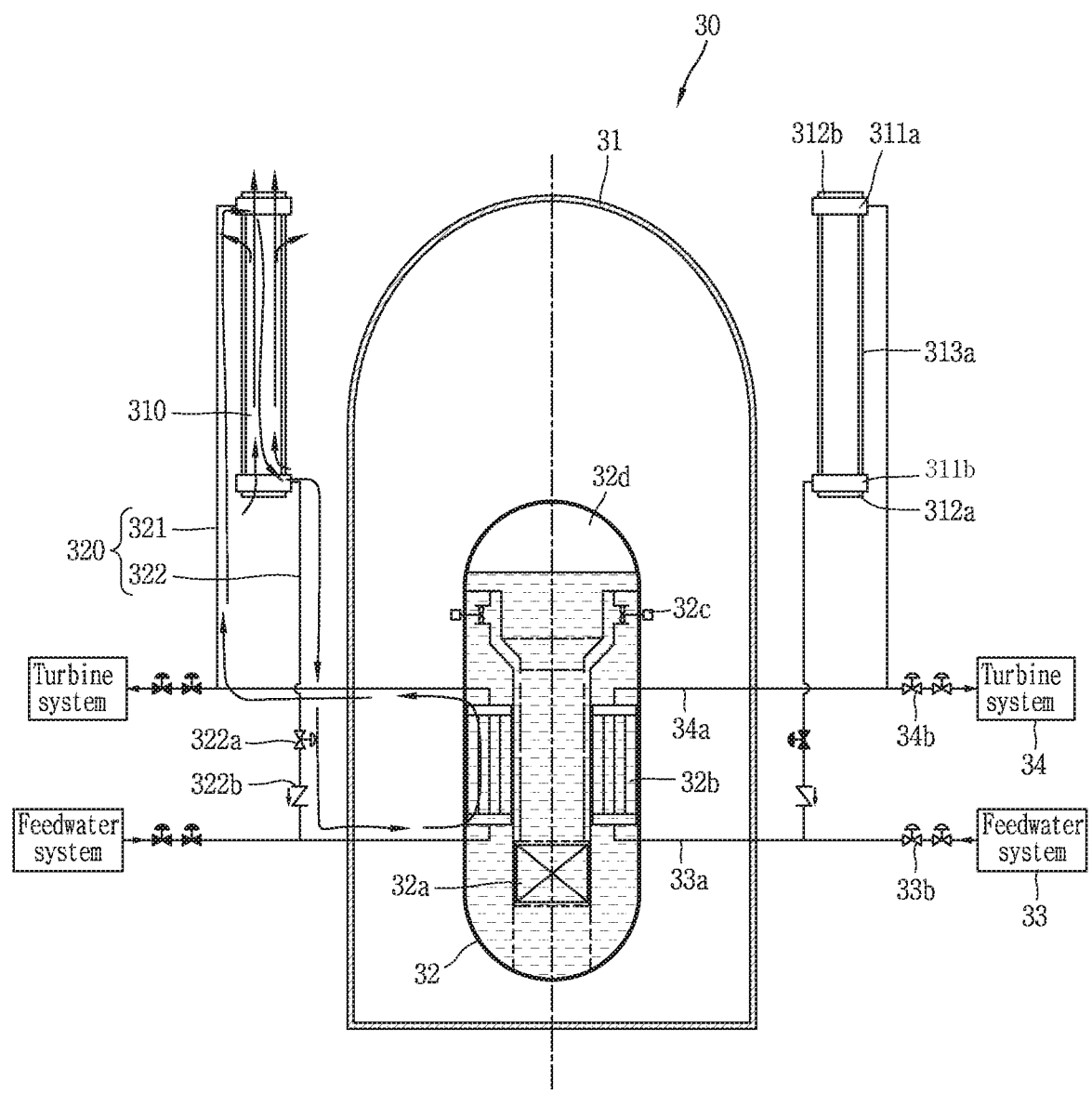
FIG. 4 is a conceptual view illustrating a passive residual heat removal system and a nuclear power plant including the same associated with still another embodiment of the present disclosure.

FIG. 4 is a conceptual view illustrating a passive residual heat removal system 300 and a nuclear power plant 30 including the same associated with yet still another embodiment of the present disclosure. The right side of a drawing symmetrically illustrated in FIG. 4 illustrates a normal operation of the nuclear power plant 30, and the left side thereof illustrates the occurrence of an accident at the nuclear power plant 30.

The passive residual heat removal system 300 cools secondary system fluid only with an air cooling method without any emergency cooling water storage section contrary to the passive residual heat removal system 100, 200 illustrated in FIGS. 1 through 3.

Atmosphere outside a containment 31 is introduced to a first flow path of a plate type heat exchanger 310, and secondary system fluid supplied from a steam generator 32b is introduced to a second flow path thereof. Heat is transferred to atmosphere from secondary system fluid passing through each flow path, and the atmosphere is discharged to an outside of the plate type heat exchanger 310. Accordingly, sensible heat and residual heat transferred from a reactor coolant system 32 and a reactor core 32a may be discharged to external atmosphere.

FIG. 4 also illustrates a circulation line 320, a steam line 321, a feedwater pipe 322, an isolation valve 322a, a check valve 322b, a reactor coolant pump 32c, a pressurizer 32d, a feedwater system 33, a main feedwater line 33a, isolation valves 33b, a turbine system 34, a main steam line 34a, isolation valves 34b, an outlet header 312b, an inlet header 311a, a casing 313a, an outlet header 311b, and an inlet header 312a.

Figure 5:
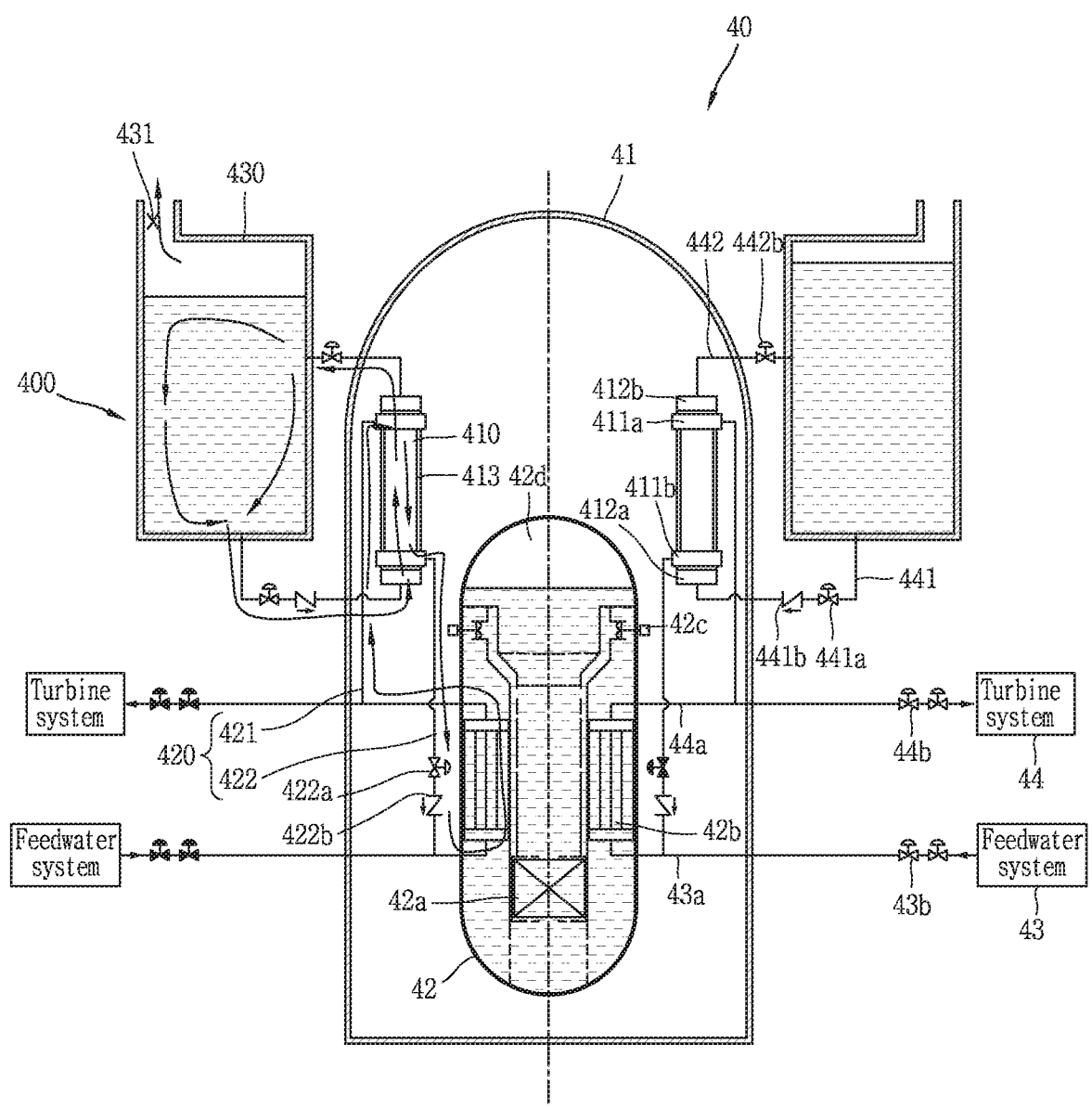
FIG. 5 is a conceptual view illustrating a passive residual heat removal system and a nuclear power plant including the same associated with yet still another embodiment of the present disclosure.

FIG. 5 is a conceptual view illustrating a passive residual heat removal system 400 and a nuclear power plant 40 including the same associated with still yet another embodiment of the present disclosure.

A plate type heat exchanger 410 is installed in an inner space of a containment 41, and an emergency cooling water storage section 430 is installed at an outside of the containment 41. The plate type heat exchanger 410 is connected to the cooling water storage section 430 by connection lines 441, 442 on which an inlet and an outlet of the first flow path pass through the containment 41, respectively, to allow cooling fluid within the cooling water storage section 430 through the first flow path.

Secondary system fluid is supplied to a second flow path of the plate type heat exchanger 410 through a main steam line 44a and a steam pipe 421 to exchange heat with cooling fluid supplied to the first flow path of the plate type heat exchanger 410 from the cooling water storage section 430. Accordingly, the secondary system fluid is cooled by a water cooling method. Both the secondary system fluid and cooling fluid continuously circulate through the plate type heat exchanger 410.

The cooling fluid of the cooling water storage section 430 is supplied to the plate type heat exchanger 410 through the connection line 441, but flows through a flow path distinguished from the secondary system fluid, and thus a pressure boundary is not damaged at the plate type heat exchanger 410. The cooling fluid of the cooling water storage section 430 receives heat from the secondary system fluid while circulating through the plate type heat exchanger 410 to increase the temperature thereof, and is introduced again to the cooling water storage section 430 through the connection line 442. When the temperature increases, the cooling fluid of the cooling water storage section 430 is evaporated to discharge the received heat to an outside.

Isolation valves 441a, 442a and a check valve 441b installed at the connection lines 441, 442 are normally open, but closed only when required for maintenance.

FIG. 5 also illustrates an opening portion 431, a circulation line 420, a feedwater pipe 422, an isolation valve 422a, a check valve 422b, a casing 413, an inlet header 412a, an outlet header 412b, an inlet header 411a, an outlet header 411b, a reactor core 42a, a steam generator 42b, a reactor coolant pump 42c, a pressurizer 42d, a feedwater system 43, a main feedwater line 43a, isolation valves 43b, an isolation valve 442b, a turbine system 44.

Figure 6:
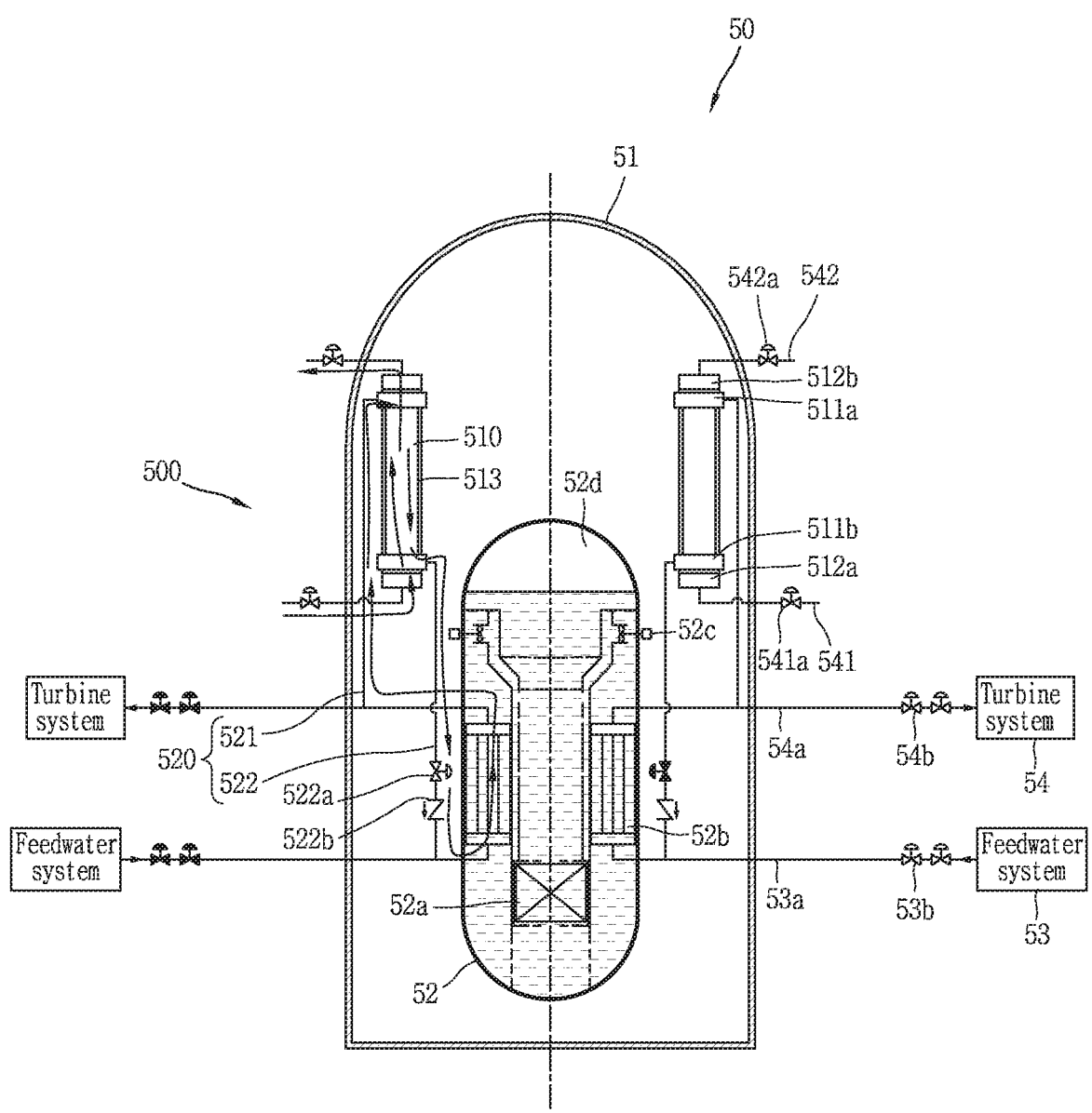
FIG. 6 is a conceptual view illustrating a passive residual heat removal system and a nuclear power plant including the same associated with still yet another embodiment of the present disclosure.

FIG. 6 is a conceptual view illustrating a passive residual heat removal system 500 and a nuclear power plant 50 including the same associated with yet still another embodiment of the present disclosure.

A plate type heat exchanger 510 is installed in an inner space of a containment 51, but an emergency cooling water storage section is not installed. The plate type heat exchanger 510 is formed such that an inlet and an outlet of the first flow path communicate with an outside of the containment 51 by connection lines 541, 542 passing through the containment 51.

External atmosphere is introduced into the plate type heat exchanger 510 through the connection lines 541, 542 by natural circulation and flows along the first flow path. Accordingly, secondary system fluid flowing along the second flow path is cooled with an air cooling method.

Atmosphere introduced from an outside of the containment 51 is supplied to the plate type heat exchanger 510 through the connection lines 541, 542, but flows through a flow path distinguished from the secondary system fluid, and thus a pressure boundary is not damaged at the plate type heat exchanger 510.

FIG. 6 also illustrates a casing 513, a circulation line 520, a steam line 521, a feedwater pipe 522, a reactor core 52*a*, a steam generator 52*b*, a reactor coolant pump 52*c*, a pressurizer 52*d*, a feedwater system 53, a main feedwater line 53*a*, isolation valves 53*b*, a turbine system 54, a main steam line 54*a*, isolation valves 54*b*, an isolation valve 542*a*, an outlet header 512*b*, an inlet header 511*a*, an outlet header 511*b*, an inlet header 512*a*, an isolation valve 541*a*, a check valve 522*a*.

Figure 7:
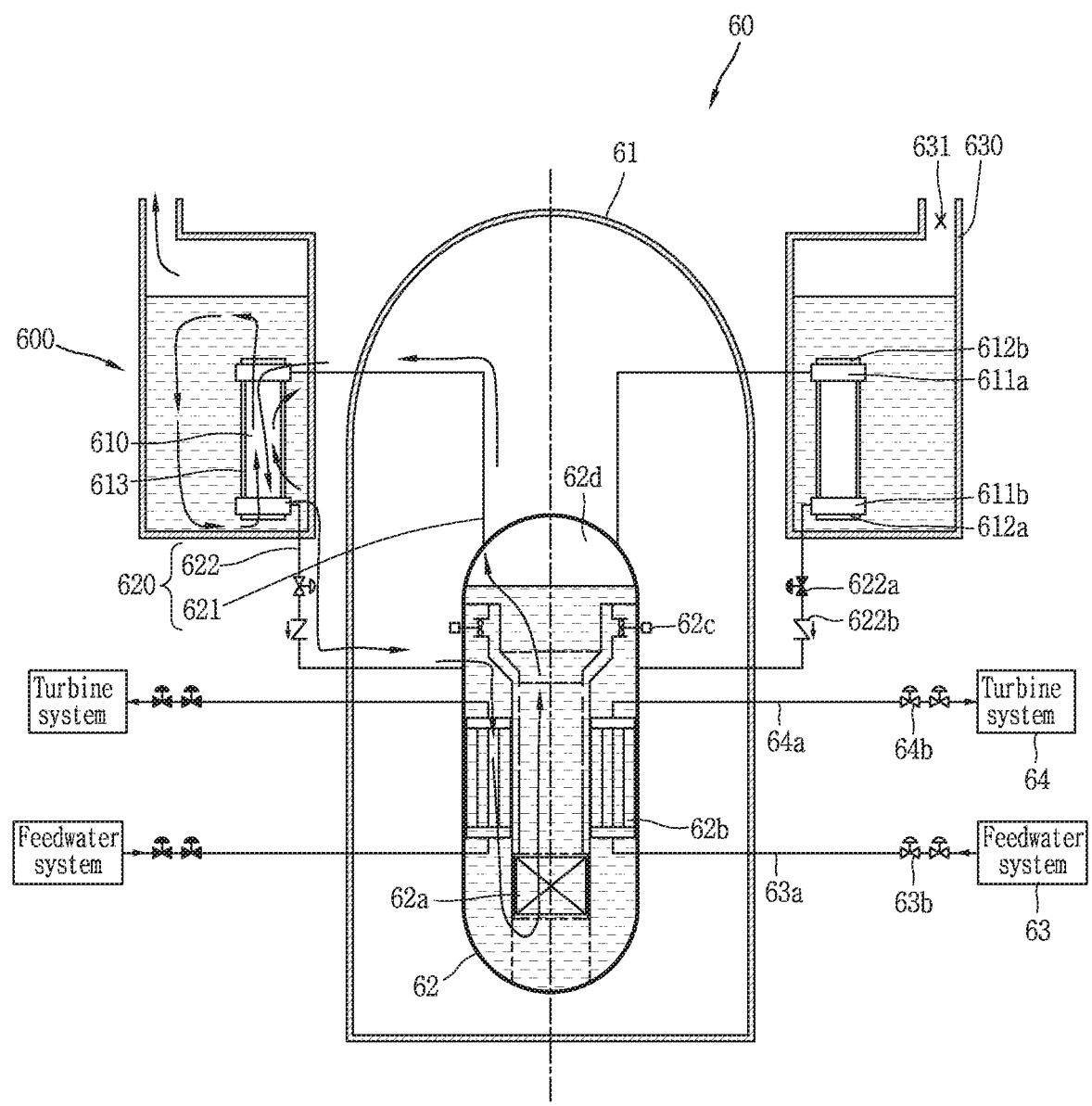
FIG. 7 is a conceptual view illustrating a passive residual heat removal system and a nuclear power plant including the same associated with yet still another embodiment of the present disclosure.

FIG. 7 is a conceptual view illustrating a passive residual heat removal system 600 and a nuclear power plant 60 including the same associated with still yet another embodiment of the present disclosure.

The passive residual heat removal system 600 is configured to remove sensible heat in a reactor coolant system 62 and residual heat in a reactor core 62*a* using primary system fluid contrary to the passive residual heat removal system illustrated in FIGS. 1 through 6. An emergency cooling water storage section 630 is installed at an outside of a containment 61, and a plate type heat exchanger 610 is immersed into the cooling fluid of the emergency cooling water storage section 630.

A circulation line 620 may include a steam line 621 and an injection line 622.

The steam line 621 is connected to the reactor coolant system 62 and an inlet of the second flow path through the containment 61 to receive primary system fluid from the reactor coolant system 62 and transfer it to the plate type heat exchanger 610. The injection line 622 is an outlet of the second flow path and the reactor coolant system 62 through the containment 61 to transfer heat to the cooling fluid and reinject the cooled primary system fluid to the reactor coolant system 62.

The cooling fluid of the emergency cooling water storage section 630 flows into the first flow path of the plate type heat exchanger 610, and primary system fluid flows into the second flow path to carry out cooling with a water cooling method, and the passive residual heat removal system 600 circulates primary system fluid to remove sensible heat in the reactor coolant system 62 and residual heat in the reactor core 62*a*.

FIG. 7 also illustrates a casing 613, a steam generator 62*b*, a reactor coolant pump 62*c*, a pressurizer 62*d*, a feedwater system 63, a main feedwater line 63*a*, isolation valves 63*b*, a turbine system 64, a main steam line 64*a*, isolation valves 64*b*, opening portion 631, an outlet header 612*b*, an inlet header 611*a*, an outlet header 611 *b*, and an inlet header 612*a*.

The primary system fluid and the cooling fluid flow through flow paths distinguished from each other, and thus the passive residual heat removal system 600 may exchange heat without damaging a pressure boundary. Unless the pressure boundary is damaged, the plate type heat exchanger 610 may be installed within the containment 61 contrary to the illustration. Furthermore, it may employ a circulation composition of the primary system fluid instead of the secondary system fluid in FIGS. 1 through 6.

In the above, a composition of the passive residual heat removal system and the operation of the passive residual heat removal system due to natural circulation have been described, but in actuality when the plate type heat exchanger is applied to the passive residual heat removal system, problems such as flow instability in a two phase flow region, bottleneck phenomenon at a heat exchanger inlet, and the like may occur, and thus it is required to resolve them. Hereinafter, a structure of the plate type heat exchanger proposed by the present disclosure to enhance the problems will be described.

The following description will be described without distinguishing a first flow path from a second flow path, and unless the description thereof is only limited to either one of the first flow path and the second flow path, the description of the first flow path will be also applicable to that of the second flow path, and the description of the second flow path will be also applicable to that of the first flow path.

Hereinafter, the detailed structure of a plate type heat exchanger 710 applicable to a passive residual heat removal system 100, 200, 300, 400, 500, 600 illustrated in FIGS. 1 through 7 will be described.

FIGS. 8 through 14 are flow path conceptual views illustrating a plate type heat exchanger 710 selectively applicable to the passive residual heat removal system 100, 200, 300, 400, 500, 600 illustrated in FIGS. 1 through 7.

When a fabrication technique of a printed circuit type heat exchanger is applied to the plate type heat exchanger 710, it has a structure capable of allowing a dense flow path arrangement by a photochemical etching technology and removing a welding between the plates of the heat exchanger using a diffusion bonding technology, and allows a typical plate type heat exchanger to have a dense flow path arrangement. The plate type heat exchanger 710 may include channels 715, 716 distinguished from each other on a plate to exchange heat between the atmosphere of the containment 11, 21, 31, 41, 51, 61 (refer to FIGS. 1 through 7) and the cooling fluid of the emergency cooling water storage section 130, 230, 430, 630 (refer to FIGS. 1 through 3, 5, and 7) and exchange heat between fluids while maintaining a pressure boundary.

The channels 715, 716 may include a first flow path 715 for allowing cooling fluid to pass therethrough, and a second flow path 716 for allowing primary system fluid or secondary system fluid to pass therethrough, and each channel 715, 716 corresponds to either one of the first flow path 715 and the second flow path 716.

The shape of the first flow path 715 and second flow path 716 may be a closed flow path in the shape of allowing cooling fluid or atmosphere to pass therethrough only in one direction and allowing primary system fluid or secondary system fluid to pass therethrough only in a direction opposite to the one direction.

Furthermore, contrary to the second flow path 716, the shape of the first flow path 715 may be also an open flow path or partially open flow path in the shape of allowing cooling fluid or atmosphere to pass therethrough even in a direction crossing the one direction. The first flow path for allowing cooling fluid or atmosphere to pass therethrough may selectively employ an open flow path or partially open flow path for cooling with an air cooling method or with an air cooling method and a hybrid cooling method in the plate type heat exchanger 710 in a relatively long length. However, when the open flow path is employed in case of the second flow path 716, a pressure boundary may be damaged, and thus the open flow path cannot be applied thereto.

Figure 8:
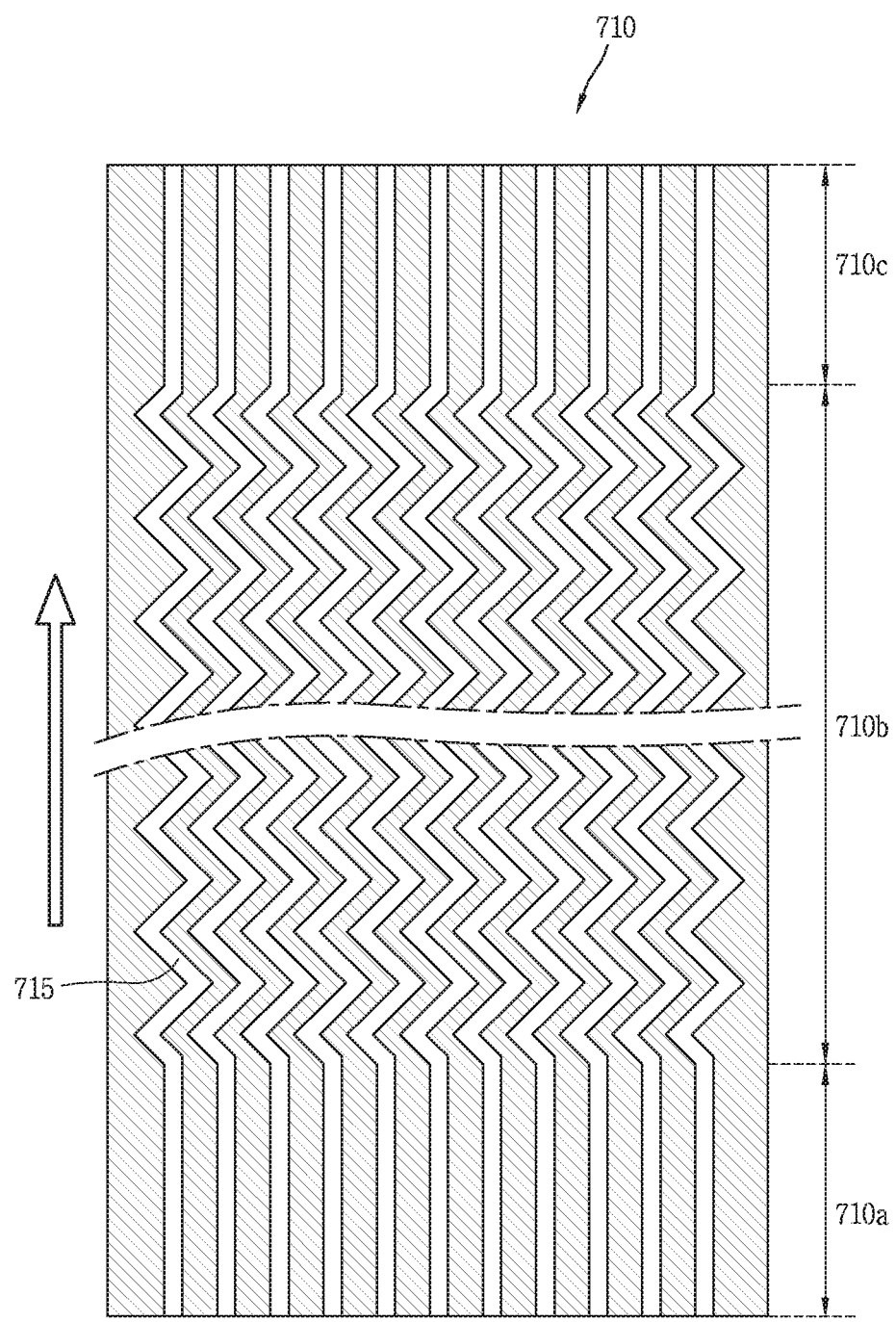
FIGS. 8 through 14 are flow path conceptual views illustrating a plate type heat exchanger selectively applicable to the passive residual heat removal system in FIGS. 1 through 7.

First, referring to FIG. 8, the plate type heat exchanger 710 illustrated in the drawing shows a cross-section of the first flow path 715 through which cooling fluid flows. The plate type heat exchanger 710 may include an inlet region 710a, a main heat transfer region 710b, and an outlet region 710c. The inlet region 710a is a region for distributing cooling fluid supplied to the plate type heat exchanger 710 to each first flow path 715, and the main heat transfer region 710b is a region for carrying out substantial heat exchange between cooling fluid and primary system fluid, cooling fluid and secondary system fluid, and the outlet region 710c is a region for collecting and discharging fluids that have completed heat exchange from the first flow path 715. The main heat transfer region 710b is connected between the inlet region 710a and the outlet region 710c, and formed between the inlet region 710a and the outlet region 710c.

The temperature of the cooling fluid is lower than that of the primary system fluid or secondary system fluid, and thus the cooling fluid receives heat from the primary system fluid or secondary system fluid while passing through the plate type heat exchanger 710 to increase the temperature. When the temperature of the cooling fluid increases, the density thereof decreases, and thus the cooling fluid flows upward within the plate type heat exchanger 710.

Figure 9:
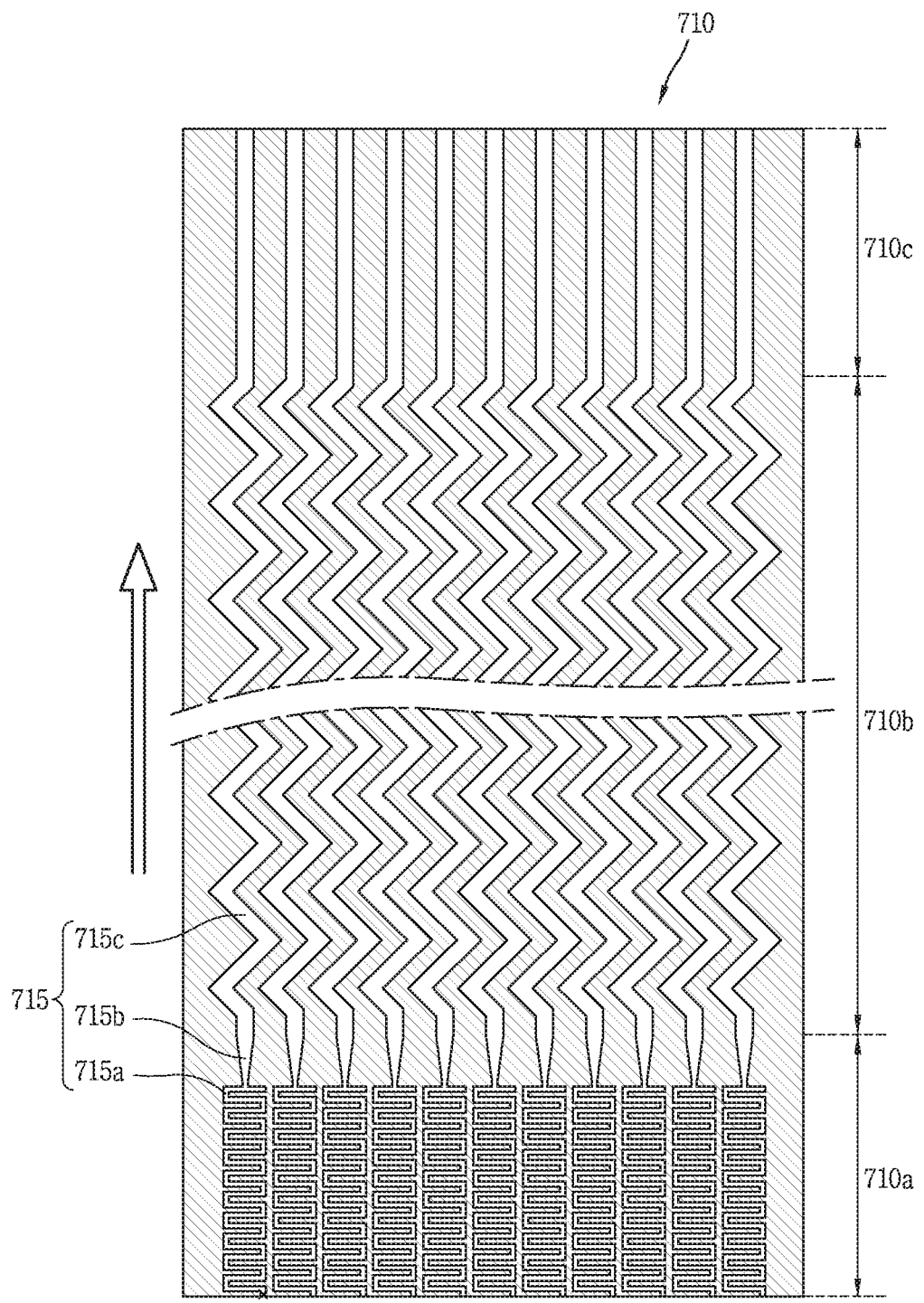

Next, referring to FIG. 9, the flow paths may be formed in such a manner that a flow resistance of the inlet region 710a is relatively larger than that of the main heat transfer region 710b connected between the inlet region 710a and the outlet region 710c to mitigate flow instability due to two phase flow.

There may be various methods of forming a relatively large flow resistance, but the plate type heat exchanger 710 illustrated in FIG. 9 employs a method in which a flow path in the inlet region 710a is formed with a smaller width than that of the main heat transfer region 710b and extended in a lengthy manner.

A flow path 715a of the inlet region 710a is formed in a zigzag shape to have a relatively larger flow resistance than that of a straight flow path and connected to the main heat transfer region 710b. Specifically, it is formed in a shape in which the flow path of the inlet region 710a is alternatively and repetitively connected in a length direction and a width direction of the plate type heat exchanger 710, and extended to the main heat transfer region 710b. As a flow resistance of the inlet region 710a is formed to be larger than that of the main heat transfer region 710b, it may be possible to reduce a flow instability occurrence probability in two phase flow.

A flow expansion section 715b is formed between the inlet region 710a and the main heat transfer region 710b, and formed in such a manner that a width of the flow path gradually increases toward an extension direction from a flow path size of the inlet region 710a to a flow path size of the main heat transfer region 710b. The flow resistance relatively decreases while passing the flow expansion section 715b, and the relatively small flow resistance is maintained on the flow path of the subsequent main heat transfer region 710b and outlet region 710c.

FIGS. 10 through 12B are conceptual views illustrating the plate type heat exchanger 710 having a header at an inlet and an outlet, respectively.

Figure 10:
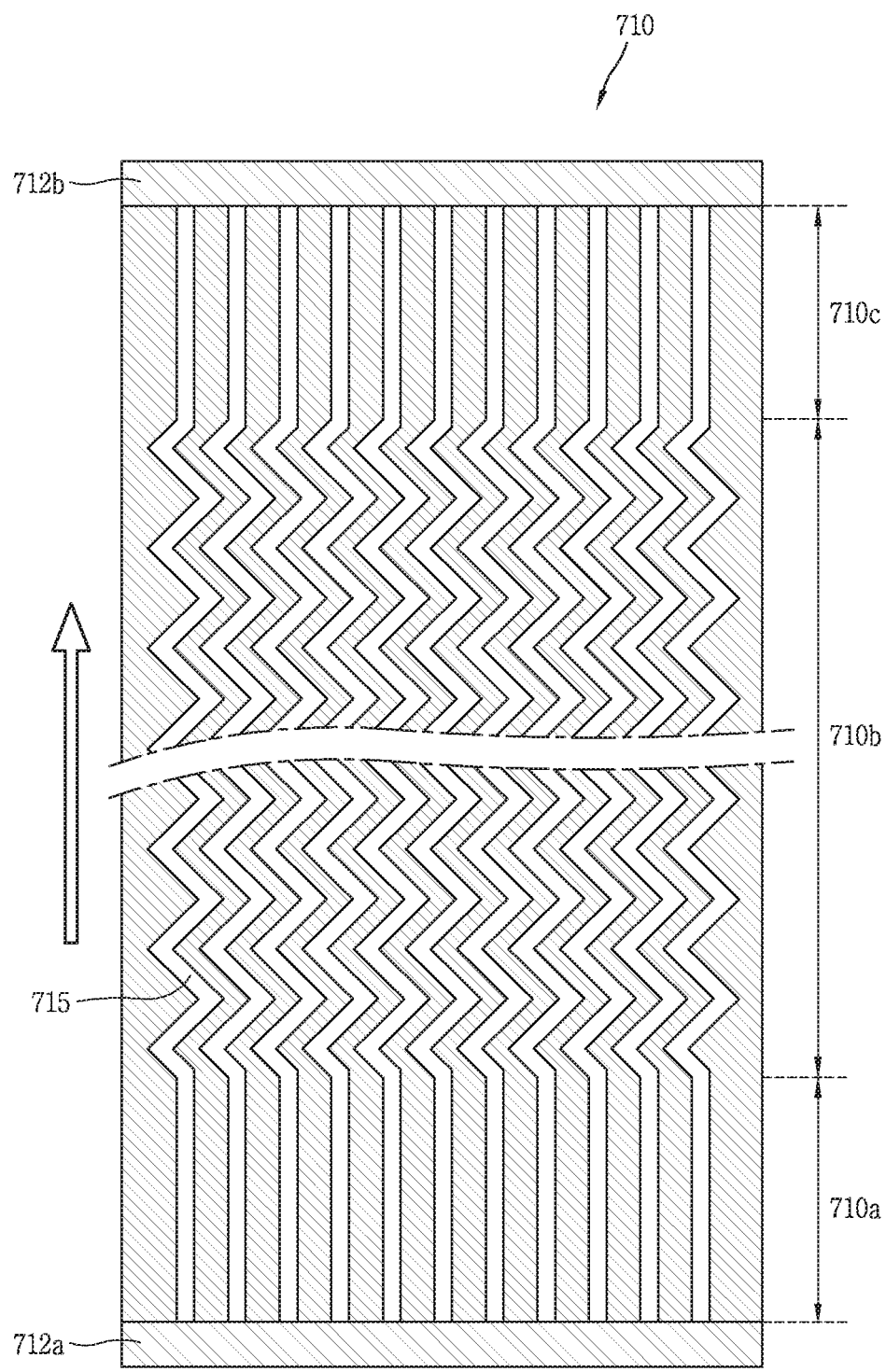

First, referring to FIG. 10, an inlet header 712a for distributing a fluid to each flow path and an outlet header 712b for collecting a fluid from each flow path may be installed at the plate type heat exchanger 710. The inlet header 712a and outlet header 712b are structures that should be necessarily installed to prevent a pressure boundary damage when the plate type heat exchanger is installed at an inside of the containment 11, 21, 31, 41, 51, 61 (refer to FIGS. 1 through 7), but they are not structures that should be necessarily installed when installed at an outside of the containment, and may not be installed or replaced with a flow path guide structure for efficiently carrying out the flow of the inlet and outlet.

The inlet header 712a is installed at an inlet of the flow path to distribute cooling fluid supplied from the emergency cooling water storage section 130, 230, 430, 630 (refer to FIGS. 1 through 3, 5, and 7) or atmosphere supplied from an outside of the containment to each first flow path 715. Furthermore, the outlet header 712b is installed at an outlet of the first flow path 715 to collect cooling fluid that has passed the first flow path 715 and return it to the emergency cooling water storage section or discharge it to an outside.

The installation location of the inlet header 712a and outlet header 712b may vary according to the design of the plate type heat exchanger 710. In particular, when a fabrication technique of a printed circuit type heat exchanger is applied to the plate type heat exchanger 710, it may be fabricated by a photochemical etching technology to freely select the structure of channels 715, 716, and a typical plate type heat exchanger may have a very free flow path structure, and thus the location of the inlet header 712a and outlet header 712b may also vary.

Figure 11:
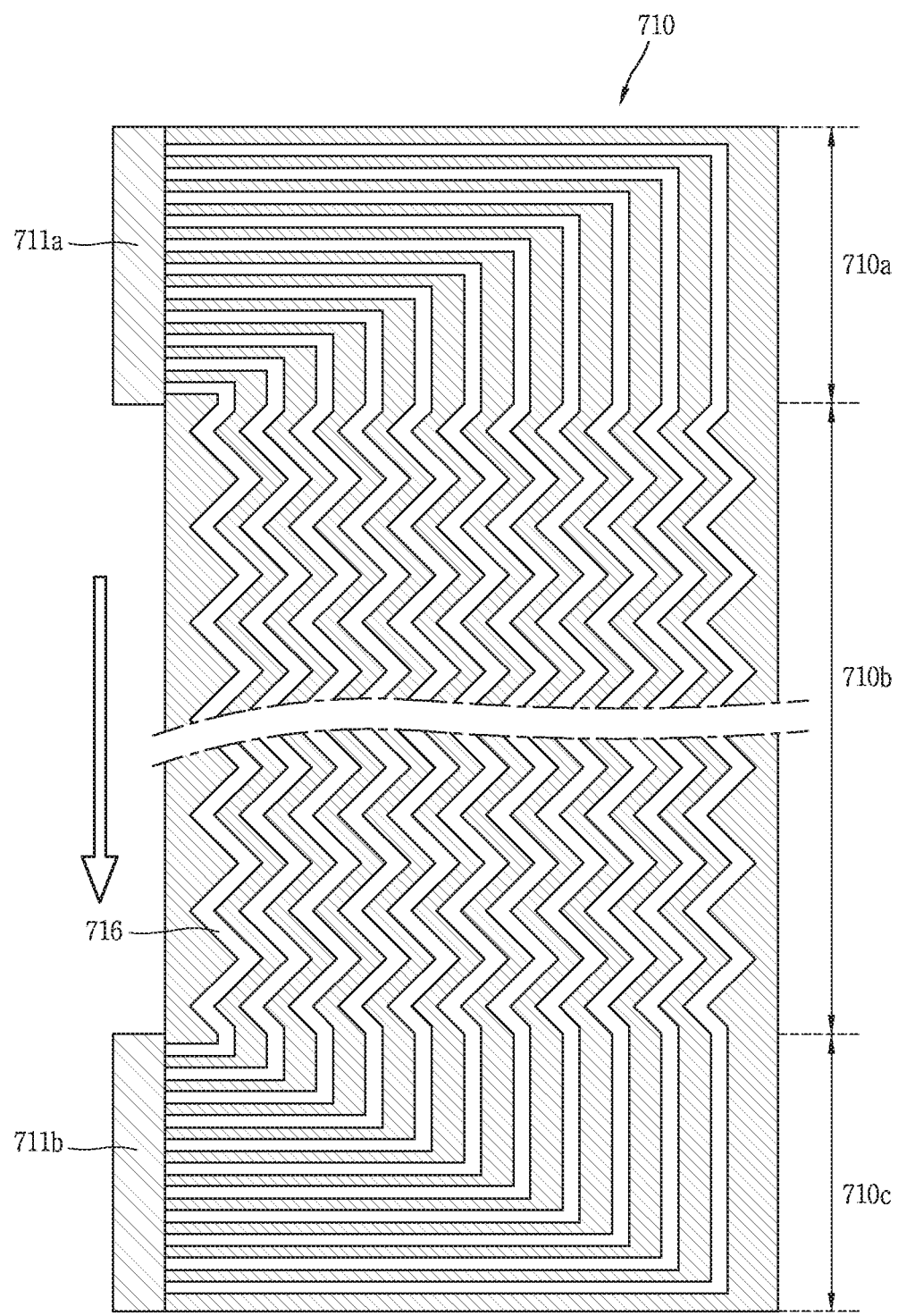
Figure 12A:
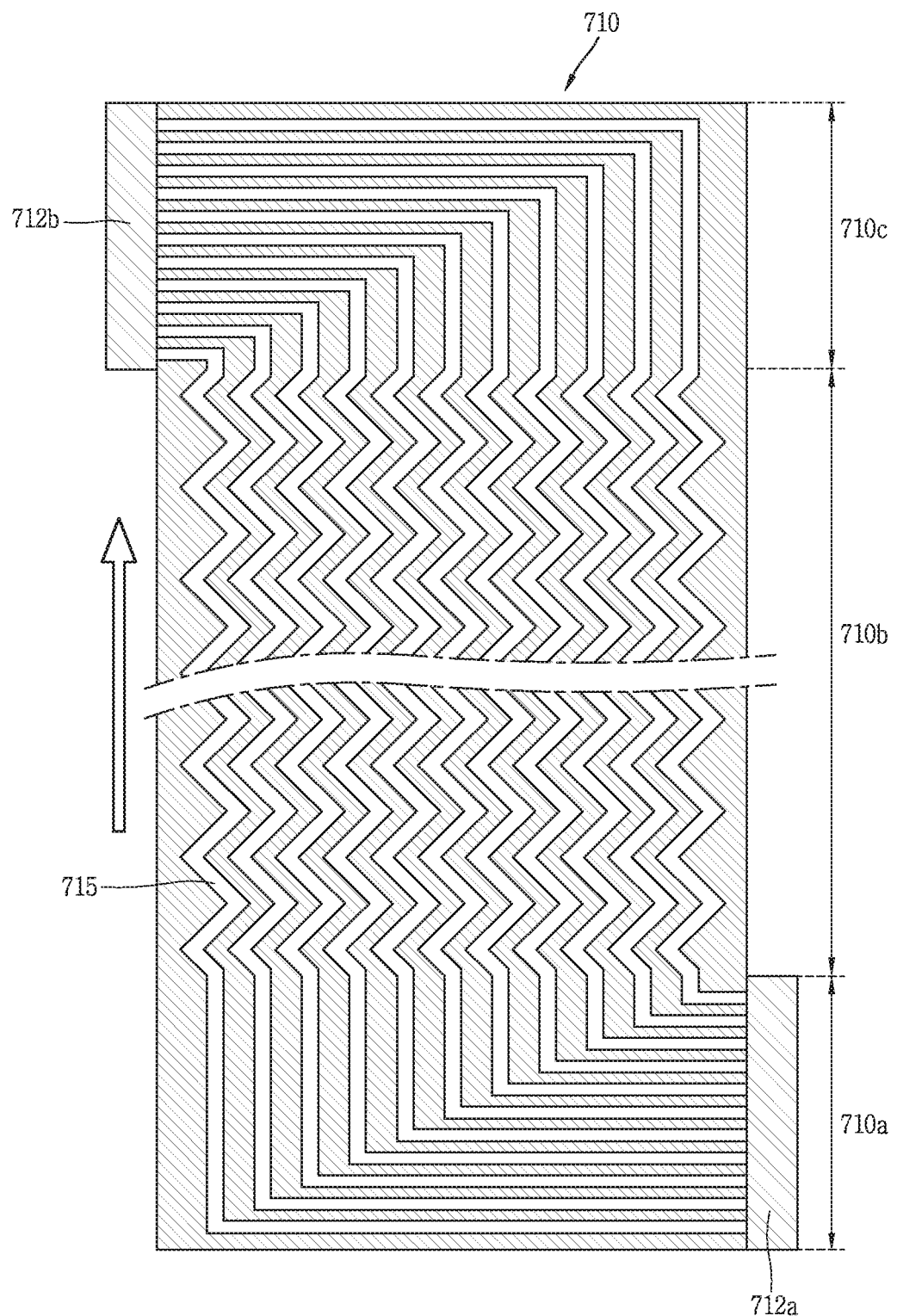
Figure 12B:
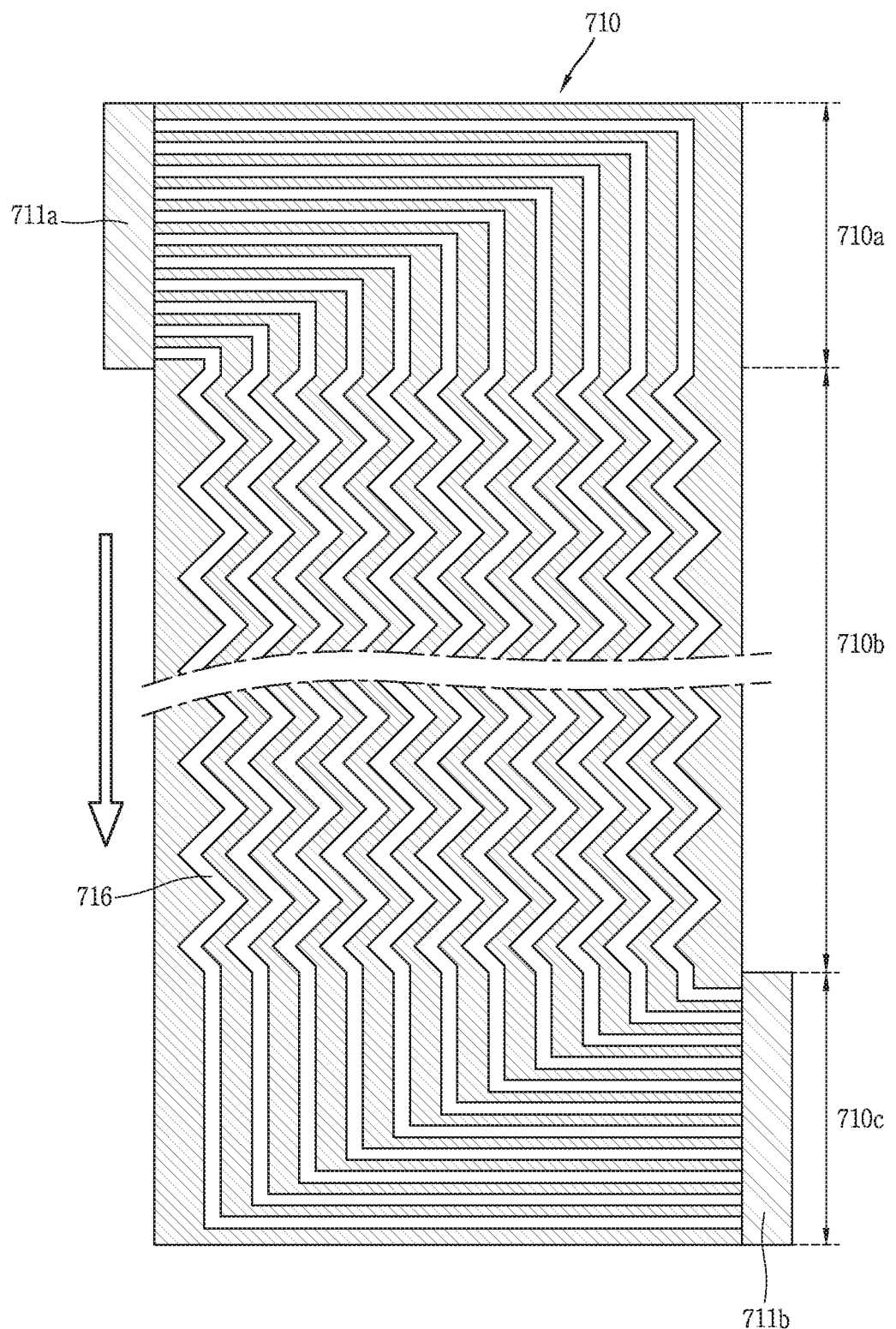

Referring to FIGS. 11 through 12B, the inlet header 711a, 712a and outlet header 711b, 712b are installed at a lateral surface of the plate type heat exchanger 710, respectively, and each flow path 715, 716 is bent in the inlet region 710a and outlet region 710b or formed to have a curved flow path and extended to the inlet header 711a, 712a or outlet header 711b, 712b.

An extension direction of the flow path 715, 716 in the inlet region 710a and an extension direction of the flow path 715, 716 in the outlet region 710c may be the same direction as illustrated in FIG. 11, or may be opposite directions to each other as illustrated in FIGS. 12A and 12B, and vary according to the design of the passive residual heat removal system.

FIGS. 12A and 12B illustrate the first flow path 715 and second flow path 716 of the plate type heat exchanger 710, respectively. The first flow path 715 receives heat while cooling fluid or external atmosphere passes therethrough to increase the temperature or evaporates to decrease the density, and the second flow path 716 transfers heat to the cooling fluid or atmosphere while primary system fluid or secondary system fluid passes therethrough to decrease the temperature or condenses to increase the density.

Figure 13:
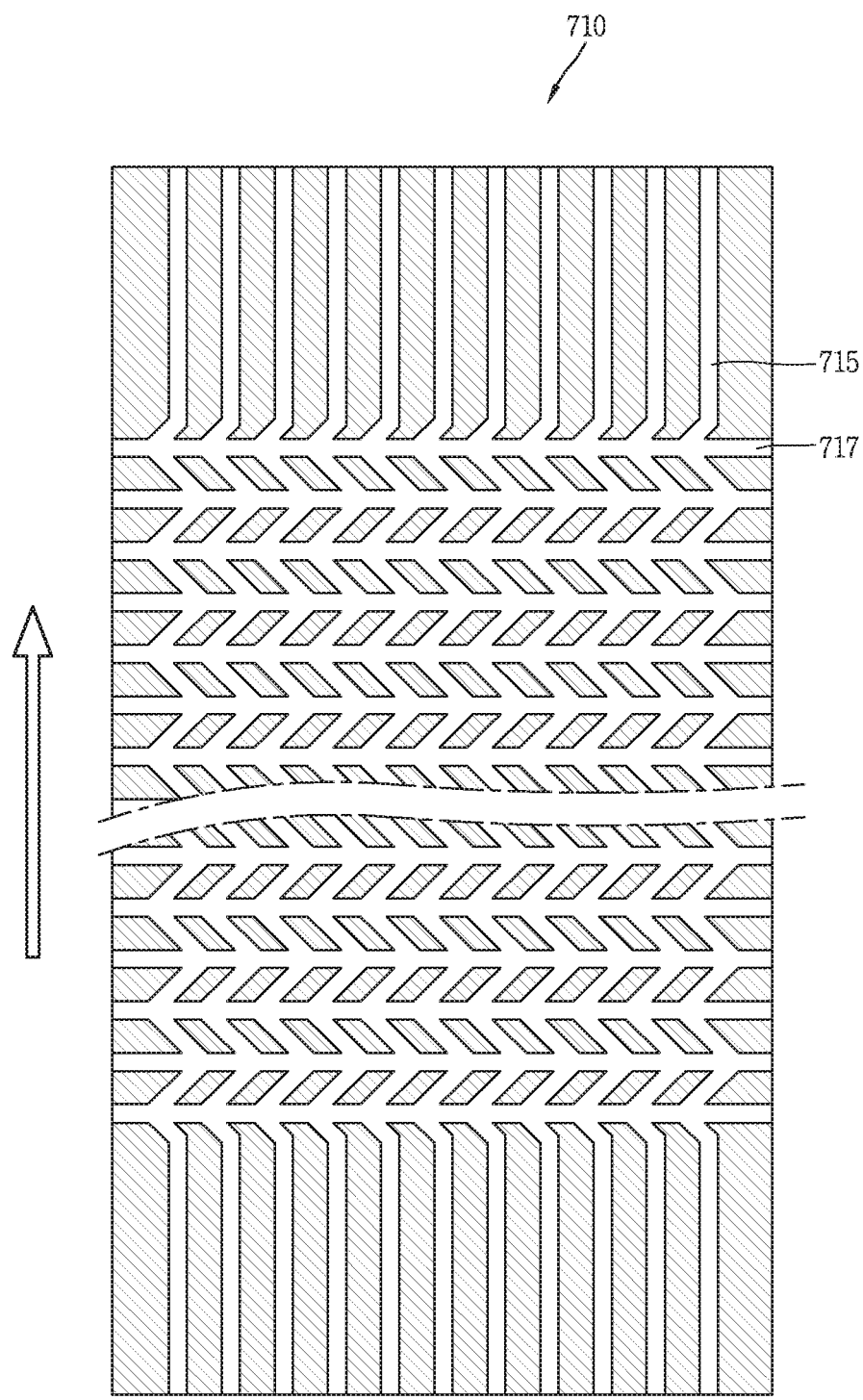
Figure 14:
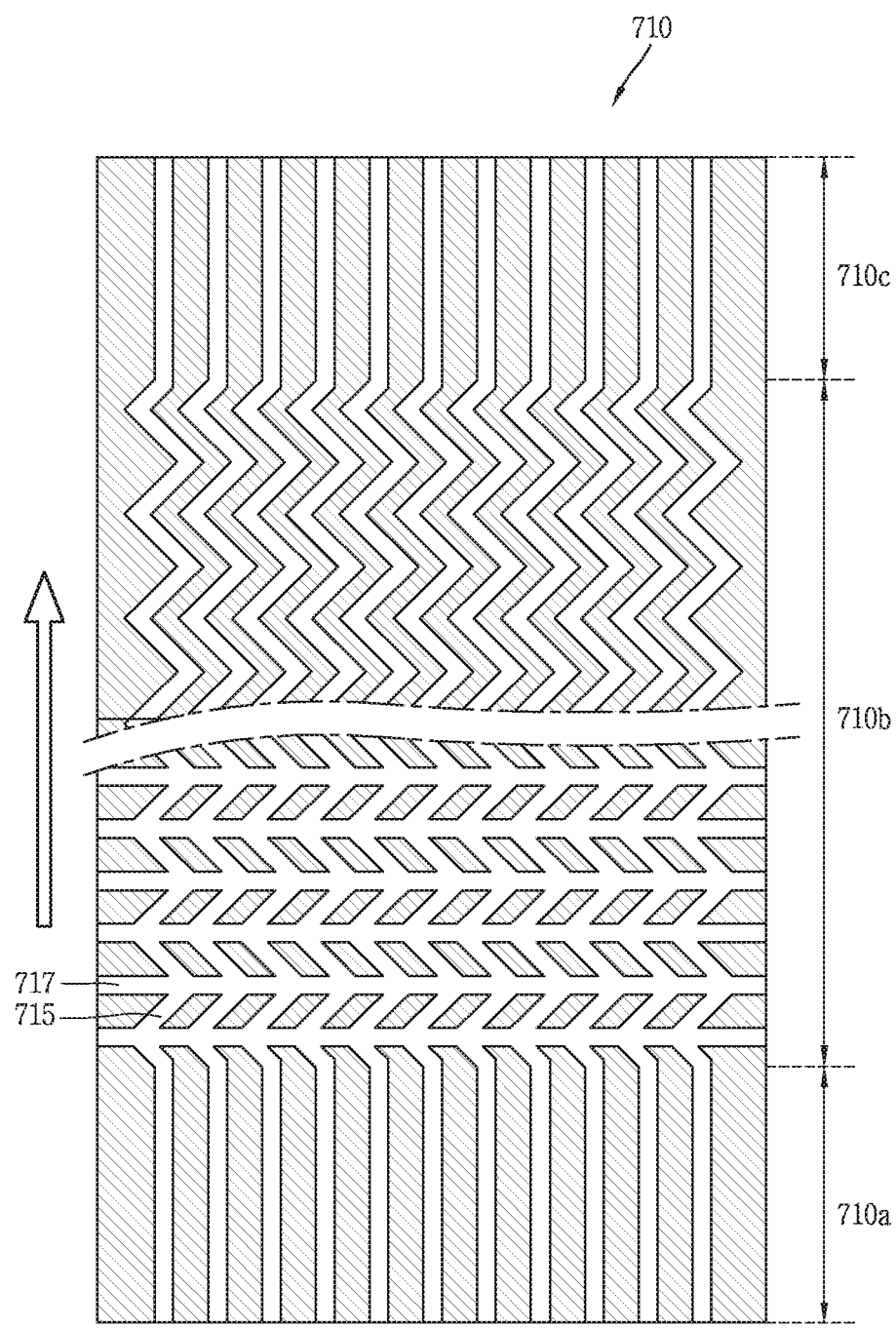

FIGS. 13 and 14 are flow path conceptual views illustrating the plate type heat exchanger 710 having an open flow path or partially open flow path, respectively.

Referring to FIG. 13, the plate type heat exchanger 710 may include an open flow path formed to introduce cooling fluid or atmosphere from a lateral surface to join cooling fluid and atmosphere passing through the first flow path so as to mitigate a bottleneck phenomenon at the inlet while maintaining a pressure boundary between fluids. Furthermore, referring to FIG. 14, the plate type heat exchanger 710 may include a partially open flow path in which a flow path is formed in an open shape only at part of the main heat transfer region 710b.

The plate type heat exchanger 710 having an open flow path or partially open flow path may include a longitudinal flow path 715 and a transverse flow path 717 forming the open flow path or partially open flow path. The longitudinal flow path 715 is connected between the inlet region 710a at an upper end portion of the plate type heat exchanger 710 and the outlet region 710c at a lower end portion thereof. The transverse flow path 717 is formed to flow the cooling fluid or atmosphere in or out through an inlet and an outlet formed at both side sections of the plate type heat exchanger 710 and cross the longitudinal flow path 715 so as to mitigate a bottleneck phenomenon of the inlet.

In particular, the plate type heat exchanger 710 formed with an open flow path may form a passive residual heat removal system with only an air cooling method for cooling primary system fluid or secondary system fluid with only atmosphere. Furthermore, the plate type heat exchanger 710 may form a passive residual heat removal system with a hybrid method (water-air hybrid) for cooling primary system fluid or secondary system fluid with atmosphere and cooling fluid. The plate type heat exchanger 710 for cooling primary system fluid or secondary system fluid with an air cooling or hybrid method may be preferably formed in a relatively long length.

The plate type heat exchanger 710 formed with a partially open flow path is to alleviate the overcooling problem of the reactor coolant system 12, 22, 32, 42, 52, 62 (refer to FIGS. 1 through 7), and the partially open flow path is configured to operate in a water cooling method at an early stage of the accident so as to facilitate the circulation of cooling fluid, and suppress an additional cooling rate increase due to the introduction of atmosphere.

In the plate type heat exchanger 710 of the present disclosure, the open flow path or partially open flow path may be formed only on the first flow path 715 for allowing cooling fluid or atmosphere to pass therethrough. It is because the second flow path 716 circulates a closed circuit to prevent a pressure boundary from being damaged.

Figure 15:
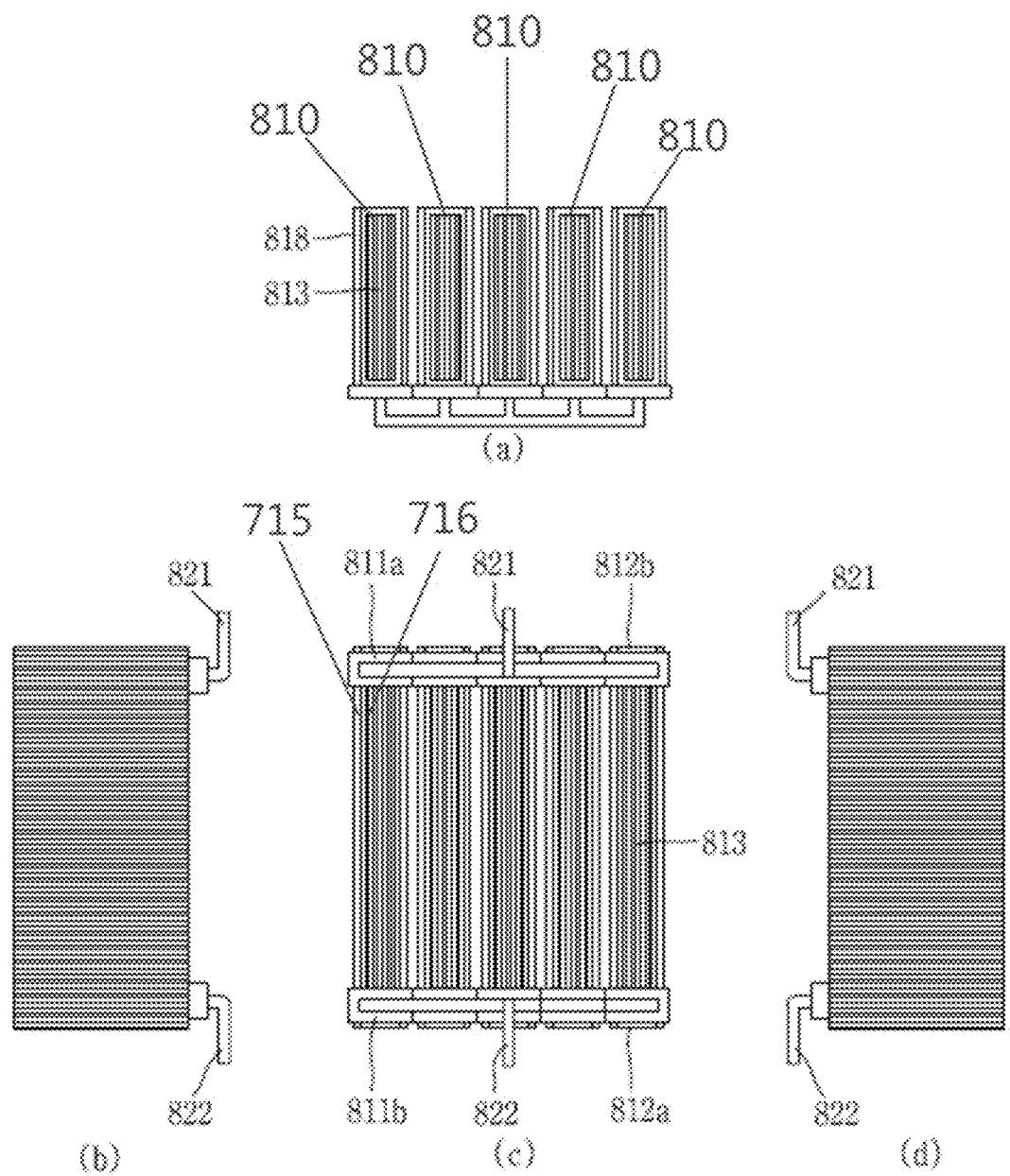
FIG. 15 is a conceptual view illustrating a plurality of plate type heat exchangers selectively applicable to the passive residual heat removal system in FIGS. 1 through 7.

FIG. 15 is a conceptual view illustrating a plurality of plate type heat exchangers 810 selectively applicable to the passive residual heat removal system 100, 200, 300, 400, 500, 600 (refer to FIGS. 1 through 7) in FIGS. 1 through 7.

FIG. 15 includes four views (a), (b), (c) and (d) for showing a plan view, a left side view, a front view, and a right side view of the plurality of plate type heat exchangers 810, respectively. Each plate type heat exchanger 810 of plurality of plate type heat exchangers is surrounded by a casing 813, and a cooling fin 818 for expanding a heat transfer area is installed at the casing 813.

The primary system fluid or secondary system fluid is distributed to each plate type heat exchanger 810 through a steam line 821, and distributed to each second flow path (not shown) by an inlet header 811a within the each plate type heat exchanger 810. The primary system fluid or secondary system fluid that has passed through the second flow path is collected by an outlet header 811b and joins again an injection line (primary system fluid circulation method) or feedwater line 822 (secondary system fluid circulation method). The cooling fluid or atmosphere is also distributed to each first flow path (not shown) by an inlet header 812a, and the cooling fluid or atmosphere that has passed through the first flow path is collected by an outlet header 812b. However, as described above, when the heat exchanger is installed at an outside of the containment, the inlet and outlet header 812a, 812b are not essential structures.

Figure 16:
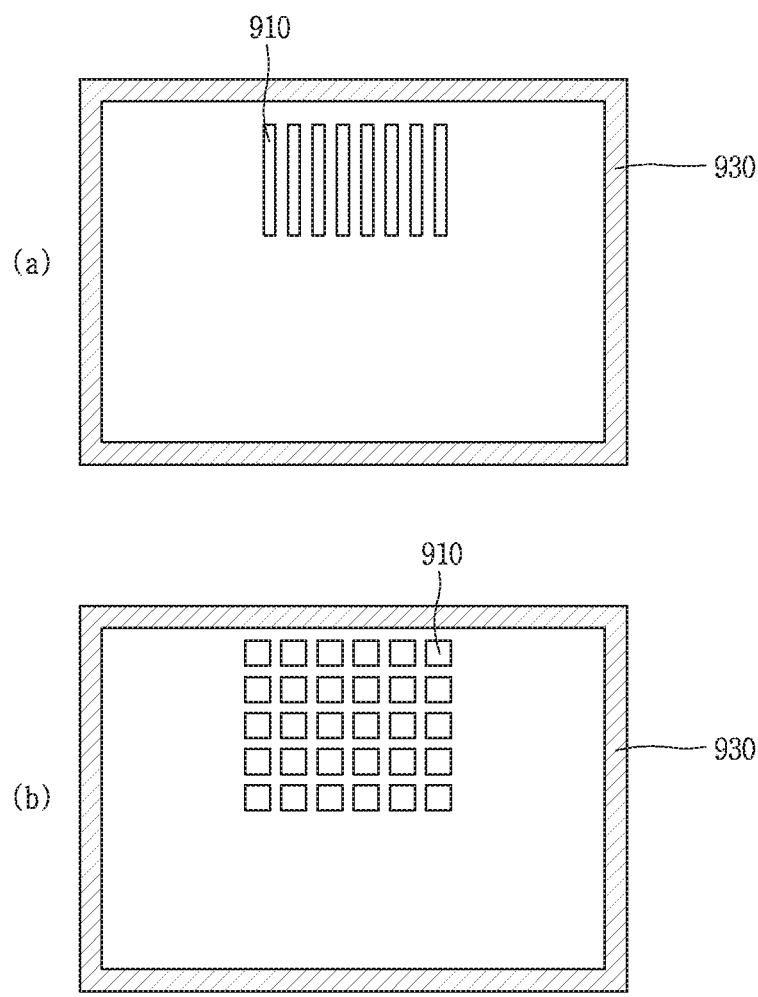
FIG. 16 is a layout conceptual view illustrating a plurality of plate type heat exchangers illustrated in FIG. 15.

FIG. 16 is a layout conceptual view illustrating a plurality of plate type heat exchangers 910 illustrated in FIG. 15.

Referring to FIG. 16A, the plurality of plate type heat exchangers 910 may be transversely arranged to form a collection of heat exchangers, and disposed within an emergency cooling water storage section 930.

Referring to FIG. 16B, the plurality of plate type heat exchangers 910 may be arranged in a lattice shape to form a collection of heat exchangers, and disposed within an emergency cooling water storage section 930.

The configurations and methods according to the above-described embodiments will not be applicable in a limited way to the foregoing passive residual heat removal system and a nuclear power plant including the same, and all or part of each embodiment may be selectively combined and configured to make various modifications thereto.

The present disclosure may be used to enhance the performance of a passive residual heat removal system in the nuclear power plant industry.

What is claimed is:

1. A passive residual heat removal system, comprising:
a plate type heat exchanger configured to exchange heat between secondary system fluid and cooling fluid, wherein the secondary system fluid has received sensible heat in a reactor coolant system and residual heat in a core, and wherein the cooling fluid is introduced from an inside or outside of a containment;
a circulation line configured to connect a steam generator to the plate type heat exchanger to form a circulation flow path of the secondary system fluid, wherein the steam generator is disposed at a boundary between a primary system and a secondary system;
an emergency cooling water storage section formed to store the cooling fluid therewithin and installed at an outside of the containment; and
a plurality of the plate type heat exchangers installed within the emergency cooling water storage section,
wherein the plurality of the plate type heat exchangers are all connected to the circulation line to receive the secondary system fluid through the circulation line, and
the circulation line is first branched into a plurality of lines in a position facing a plate type heat exchanger located at the center of the plurality of the plate type heat exchangers and the branched lines are connected to the plurality of plate type heat exchangers, respectively,
wherein a lower part of each of the plate type heat exchangers is immersed into the cooling fluid within the emergency cooling water storage section to allow the cooling fluid within the emergency cooling water storage section and atmosphere outside the containment to pass through a plurality of first channels which are provided within each of the plate type heat exchangers, and an upper part of each of the plate type heat exchangers is protruded to an upper portion of the emergency cooling water storage section through the emergency cooling water storage section to discharge the cooling fluid and fluid evaporated by heat transfer with the secondary system fluid in the atmosphere to an outside.

2. The passive residual heat removal system of claim 1, wherein each of the plate type heat exchangers comprise at least one of:
a printed circuit type heat exchanger provided with channels formed by diffusion bonding and densely formed by a photochemical etching technique; and
a plate type heat exchanger configured to extrude a plate to form channels, and formed to couple the plates using at least one of a gasket, a welding, and a brazing welding methods.

3. The passive residual heat removal system of claim 1, wherein each of the plate type heat exchangers comprise a plurality of channels for exchanging heat while maintaining a pressure boundary to the cooling fluid with the secondary system fluid supplied through the circulation line, and wherein the plurality of channels comprises:

the plurality of first channels arranged to be separated from one another to allow the cooling fluid to pass therethrough; and a plurality of second channels formed to allow the secondary system fluid to pass therethrough, and alternately arranged with the first channels to exchange heat while maintaining a pressure boundary to the cooling fluid.

4. The passive residual heat removal system of claim 3, wherein the passive residual heat removal system further comprises:

a first inlet header formed at an inlet of the plurality of first channels to distribute the cooling fluid to each first channel;

a first outlet header formed at an outlet of the plurality of the first channels to collect the cooling fluid that has passed through each first channel;

a second inlet header formed at an inlet of the plurality of second channels to distribute the secondary system fluid to each second channel; and a second outlet header formed at an outlet of the plurality of the second channels to collect the secondary system fluid that has passed through each second channel.

5. The passive residual heat removal system of claim 3, wherein the circulation line comprises:

a steam line branched from a main steam line and connected to an inlet of each of the second channels to receive the secondary system fluid from the main steam line extended from an outlet of the steam generator; and a feedwater line branched from a main feedwater line extended to an inlet of the steam generator and connected to an outlet of each of the second channels to transfer heat to the cooling fluid and recirculate the cooled secondary system fluid to the steam generator.

6. The passive residual heat removal system of claim 5, wherein the plate type heat exchanger is installed in an inner space of the containment, and communicates with an outside of the containment by a connection line in which an inlet and an outlet of the first channel pass through the containment to allow atmosphere outside the containment to pass through the first channel.

7. The passive residual heat removal system of claim 5, wherein each of the plate type heat exchangers is installed outside of the containment, and the steam line and the feedwater line are connected to the main steam line and main feedwater line from an outside of the containment.

8. The passive residual heat removal system of claim 5, wherein the emergency cooling water storage section is provided with an opening portion at an upper portion thereof to dissipate heat transferred by evaporating the cooling fluid stored therewithin during a temperature increase due to heat transferred from the secondary system fluid to the cooling fluid.

9. The passive residual heat removal system of claim 8, wherein each of the plate type heat exchangers is installed in an inner space of the containment, and an inlet and outlet of each of the first channels are connected to the emergency cooling water storage section by a connection line passing through the containment to allow cooling fluid within the emergency cooling water storage section to pass through each of the first channels.

10. The passive residual heat removal system of claim 8, wherein at least part of each of the plate type heat exchangers is installed within the emergency cooling water storage section to allow at least part thereof to be immersed into the cooling fluid.

11. The passive residual heat removal system of claim 3, wherein the circulation line comprises:

a steam line at least part of which is connected to the reactor coolant system and an inlet of the second channel to receive the primary system fluid from the reactor coolant system to transfer said fluid to each of the plate type heat exchangers; and an injection line at least part of which is connected to an outlet of each of the second channels and the reactor coolant system to reinject the primary system fluid cooled by transferring heat to the cooling fluid to the reactor coolant system.

12. The passive residual heat removal system of claim 1, wherein each of the plate type heat exchangers further comprise:

a casing formed to surround at least part of each of the plate type heat exchangers; and a cooling fin formed to surround at least part of the casing to expand a heat transfer area.

* * * * *